(12) United States Patent
Kusters, Jr. et al.

(10) Patent No.: US 10,780,968 B2
(45) Date of Patent: Sep. 22, 2020

(54) SYSTEMS AND METHODS FOR WAVE SENSING AND SHIP MOTION FORECASTING WITH OPERATIONAL PERIOD INDICATORS

(71) Applicant: Applied Physical Sciences Corp., Groton, CT (US)

(72) Inventors: John G. Kusters, Jr., Groton, CT (US); William M. Kusters, Groton, CT (US); Maximilian Leonard, Groton, CT (US); Christopher S. Brundick, Groton, CT (US)

(73) Assignee: Applied Physical Sciences Corp., Groton, MA (US)

( * ) Notice: Subject to any disclaimer, the term of this patent is extended or adjusted under 35 U.S.C. 154(b) by 334 days.

(21) Appl. No.: 15/822,819

(22) Filed: Nov. 27, 2017

(65) Prior Publication Data
US 2019/0161152 A1    May 30, 2019

(51) Int. Cl.
*B63J 99/00*    (2009.01)
*B63B 39/14*    (2006.01)
(Continued)

(52) U.S. Cl.
CPC .............. *B63J 99/00* (2013.01); *B63B 39/14* (2013.01); *G01S 7/04* (2013.01); *G01S 13/88* (2013.01);
(Continued)

(58) Field of Classification Search
CPC ....... B63J 99/00; B63J 2099/008; G01S 7/04; G01S 13/88; B63B 39/14; G06T 11/206; G06T 11/001
See application file for complete search history.

(56) References Cited

U.S. PATENT DOCUMENTS

| 3,727,217 A | 4/1973 | Nirasawa |
| 3,806,929 A | 4/1974 | Moore |
(Continued)

FOREIGN PATENT DOCUMENTS

| EP | 2167916 B1 | 3/2010 |
| WO | 2017185020 A1 | 10/2017 |

OTHER PUBLICATIONS

The International Bureau of WIPO, International Search Report and Written Opinion in Application No. PCT/US2018/61805, dated Feb. 1, 2019.
(Continued)

*Primary Examiner* — Yuen Wong
(74) *Attorney, Agent, or Firm* — LKGlobal | Lorenz & Kopf, LLP

(57) ABSTRACT

Systems and methods and described herein that can enable accurate forecasting of ship motions and the useful displaying of such forecasts to users. In general, the ship motion forecasting systems and methods provide users with graphical indication of ship motion forecasts in the form of operational period indicators. These operational period indicators are generated such that the ship motion forecasts under at least one motion threshold for a time period exceeding a time threshold are indicated in a first way, while ship motion forecasts not under the at least one motion threshold for the time period exceeding the time threshold are indicated in a second way, different from the first way. This can facilitate the quick determination of operational status by a user and thus allow a user to quickly ascertain when conditions are likely to be such that certain ship operations can be safely performed.

21 Claims, 22 Drawing Sheets

(51) Int. Cl.
G01S 7/04 (2006.01)
G01S 13/88 (2006.01)
G06T 11/00 (2006.01)
G06T 11/20 (2006.01)
B63B 79/00 (2020.01)

(52) U.S. Cl.
CPC .......... *G06T 11/001* (2013.01); *G06T 11/206* (2013.01); *B63B 79/00* (2020.01)

(56) References Cited

U.S. PATENT DOCUMENTS

| | | | |
|---|---|---|---|
| 5,381,222 | A | 1/1995 | Palmer |
| 6,382,022 | B1 | 5/2002 | Martinez et al. |
| 6,586,748 | B1 | 7/2003 | Lloyd et al. |
| 8,305,257 | B2 | 11/2012 | Trizna |
| 8,494,697 | B2 | 7/2013 | Ballou et al. |
| 8,643,509 | B1 * | 2/2014 | Chen .................. B63B 9/08 114/74 R |
| 9,783,272 | B2 | 10/2017 | Edmunds |
| 2007/0225915 | A1 * | 9/2007 | Weinzapfel .......... G01W 1/02 702/3 |
| 2014/0114509 | A1 * | 4/2014 | Venables .......... G05D 1/0875 701/21 |
| 2015/0183497 | A1 * | 7/2015 | Drouet .............. B63B 39/00 701/21 |
| 2019/0145794 | A1 * | 5/2019 | Ketchell, III ...... G05D 1/0212 |

OTHER PUBLICATIONS

W.E. Cummins, The Impulse Response Function and Ship Motions, Hydromechanics Laboratory Research and Development Report, Report No. 1661, Oct. 1962.
Rodney T. Schmitke, Ship, Sway, Roll, and Yaw Motions in Oblique Seas, The Society of Naval Architects and Marine Engineers (SNAME) Transactions, vol. 86, 1978, pp. 26-46, Nov. 16, 1978.
Professor Yoji Himeno, Prediction of Ship Roll Damping-State of the Art, Department of Naval Architecture and Marine Engineering, University of Michigan College of Engineering, Research Paper, No. 239, Sep. 1981, Ann Arbor, Michigan (USA).
William J. Plant, et al., Evidence of Bragg Scattering in Microwave Doppler Spectra of Sea Return, Journal of Geophysical Research, Sep. 15, 1990, vol. 95, No. C9, pp. 16,299-16,310, U.S. Naval Research Laboratory, Washington, D.C.
Kevin McTaggart, Appendage and Viscous Forces for Ship Motions in Waves, Technical Memorandum, Sep. 2004, Defence R&D Canada—Atlantic, DRDC Atlantic TM 2004-227.
Tristan Perez, et al., Time vs. Frequency-domain Identification of Parametric Radiation Force Models for Marine Structures at Zero Speed, Modeling, Identification and Control, vol. 29, No. 1, 2008, pp. 1-19.
Jorrit-Jan Serraris, Time Domain Analysis for DP Simulations, Proceedings of ASME 28th International Conference on Ocean, Offshore and Arctic Engineering OMAE2009, May 31-Jun. 5, 2009, Honolulu, Hawaii.
Okey G. Nwogu, et al., Surface-Wavefield Estimation from Coherent Marine Radars, IEEE Geoscience and Remote Sensing Letters, Research Paper, Nov. 12, 2009, Department of Naval Architecture and Marine Engineering, University of Ann Arbor, MI USA.
Dick K.P. Yue, et al., Phase-Resolved Reconstruction and Forecast of Ocean Wavefields Using Scanning-Sensing Wave Measurements, Report, Jan., 26, 2010, Massachusetts Institute of Technology, Cambridge, MA.
Xu Xiang, et al., Time Domain Simulation of Two Interacting Ships Advancing Parallel in Waves, Proceedings of ASME 2011 30th International Conference on Ocean, Offshore and Arctic Engineering OMAE2011, Jun. 19-24, 2011, Rotterdam, Netherlands.
William J. Plant, et al., Wave Shadowing and Modulation of Microwave Backscatter from the Ocean, Journal of Geophysical Research, Aug. 4, 2012, vol. 117, C08010, doi: 10.1029/2012JC007912, 2012.
Christine C. Schleicher, et al., Assessment of Linear Seakeeping Performance Prediction of the R/V Melville, Report, Jul. 2014, Naval Surface Warfare Center, Carderock Division, NSWCCD-80-TR-2014/021.
Benjamin S. H. Connell, et al., Development of an Environmental and Ship Motion Forecasting System, Proceedings of ASME 2015 34th International Conference on Ocean, Offshore and Arctic Engineering OMAE2015-42422, May 31-Jun. 5, 2015, Newfoundland, Canada.
William M. Milewski, et al., Reduced Order Model for Motion Forecasts of One or More Vessels, Proceedings of ASME 2015 34th International Conference on Ocean, Offshore and Arctic Engineering OMAE2015-42421, May 31-Jun. 5, 2015, Newfoundland, Canada.
J.G. Kusters, et al., FutureWaves—A Real-Time Ship Motion Forecasting System Employing Advanced Wave-Sensing Radar, Applied Sciences Corporation, USA, Sep. 20, 2016.
Gordon Farquharson, et al., Wave Sensing Radar and Wave Reconstruction, Applied Sciences Corporation, Distribution, Jul. 14, 2015.
International Bureau of WIPO, International Search Report and Written Opinion for International Application No. PCT/US2017/051639, dated Jul. 11, 2018.
Tyson Hilmer, et al., Deterministic Wave Prediction from the WaMoS II, Oceans 2014, Taipei, IEEE, Apr. 7, 2014, pp. 1-8.
Tyson Hilmer, et al., Observations of Predictive Skill for Real-Time Deterministic Sea Waves from the WaMoS II, Oceans 2015, MTS/IEEE Washington, MTS, Oct. 19, 2015, pp. 1-7.
Katrin Hessner et al: "The On-Board Wave and Motion Estimator OWME ", Proceedings of The Twentieth (2010), International Offshore and Polar Engineering Conference, Jun. 25, 2010 (Jun. 25, 2010), pp. 424-431, Xp055485214, Abstract; Figure 1.
International Bureau of WIPO, International Search Report and Written Opinion of the International Searching Authority received for Application No. PCT/US2017/051640, dated Jul. 11, 2018.
Amarcon B.V., "Octopus-Onboard the New Generation Decision-Making Support System to Optimize Ship Performance in Waves" The Netherlands, Dec. 31, 2006 (Dec. 31, 2016), Xp055212381, Retrieved From The Internet: URL:Http://Www.Messe.No/Exhibitordocuments/76960/378/0ctopusV5.Pdf [Retrieved on Sep. 9, 2015] The Whole Document.
Konstanze Reichert et al: "X-Band Radar 1-20 Derived Sea Surface Elevation Maps as Input to Ship Motion Forecasting", Oceans 2010 IEEE—Sydney, IEEE, Piscataway, NJ, USA, May 24, 2010 (May 24, 2010), pp. 1-7, Xp031777119, ISBN: 978-1-4244-5221-7, Abstract; Figure 1.
Gunther F. Clauss et al: "Critical Situations of Vessel Operations in Short Crested Seas-Forecast and Decision Support System", Journal of Offshore Mechanics and Arctic Engineering, vol. 134, No. 3, Jan. 1, 2012 (Jan. 1, 2012), p. 031601, Xp055485222, Us Issn: 0892-7219, DOI 10.1115/1.4004515, The Whole Document.
A.P. Wijaya et al: "Reconstruction and Future Prediction of The Sea Surface from Radar Observations", Ocean Engineering, vol. 106, Sep. 1, 2015 (Sep. 1, 2015), pp. 261-270, Xp055485219, Amsterdam, NL ISSN: 0029-8018, DOI: 10.1016/J.Oceaneng.2015.07.009; The Whole Document.
Rutter Inc., Seafusion Radar Data Combiner, Product Brochure, Date unknown.
Rutter Inc, Product Web Site, http://web.archive.org/web/20150512223318/http:/www.rutter.ca/.

* cited by examiner

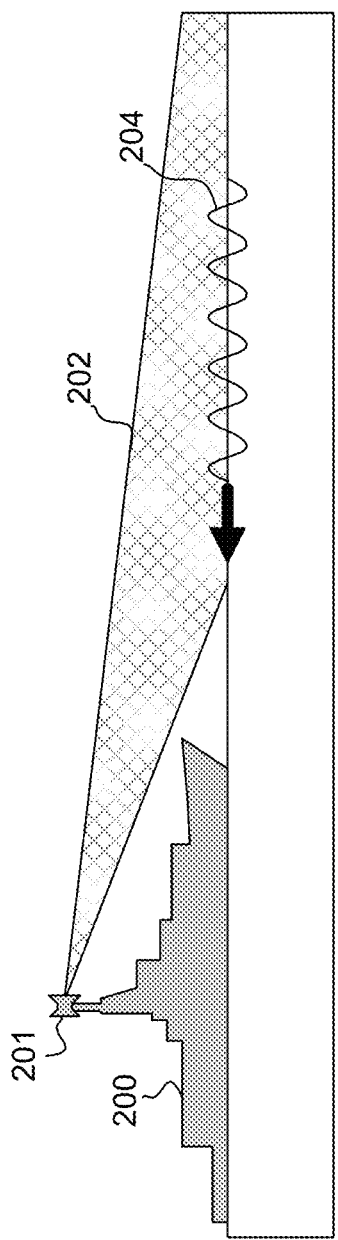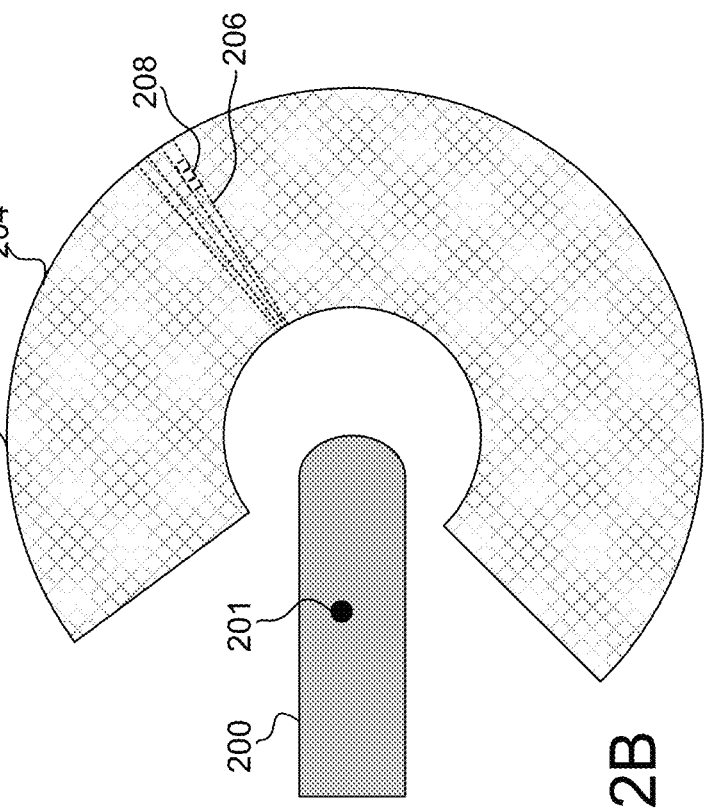
FIG. 2A
FIG. 2B

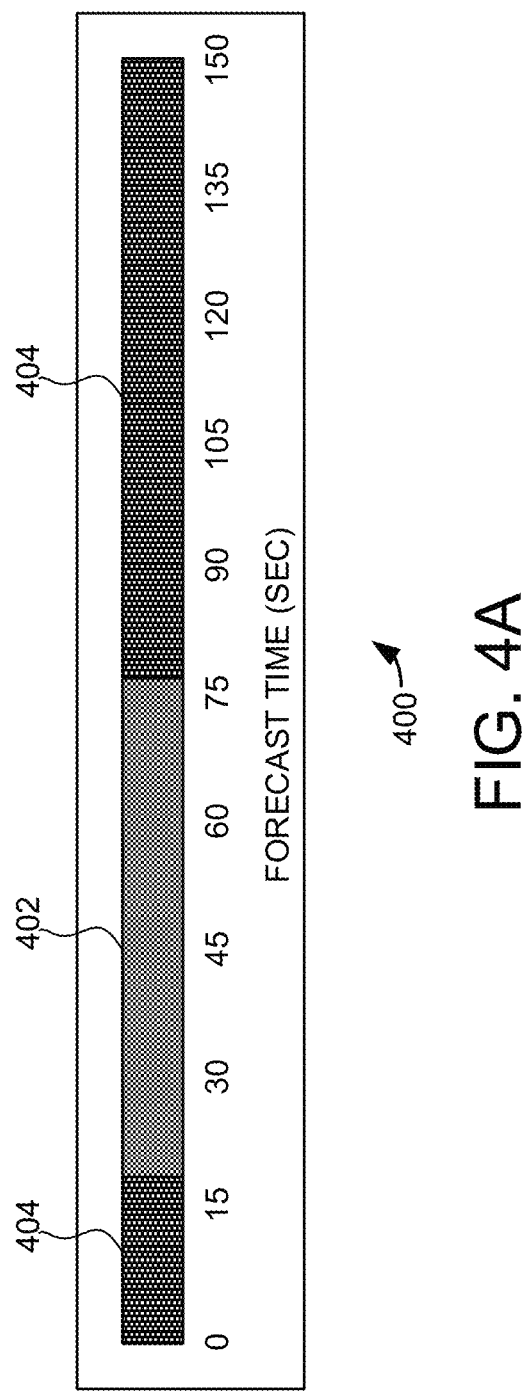

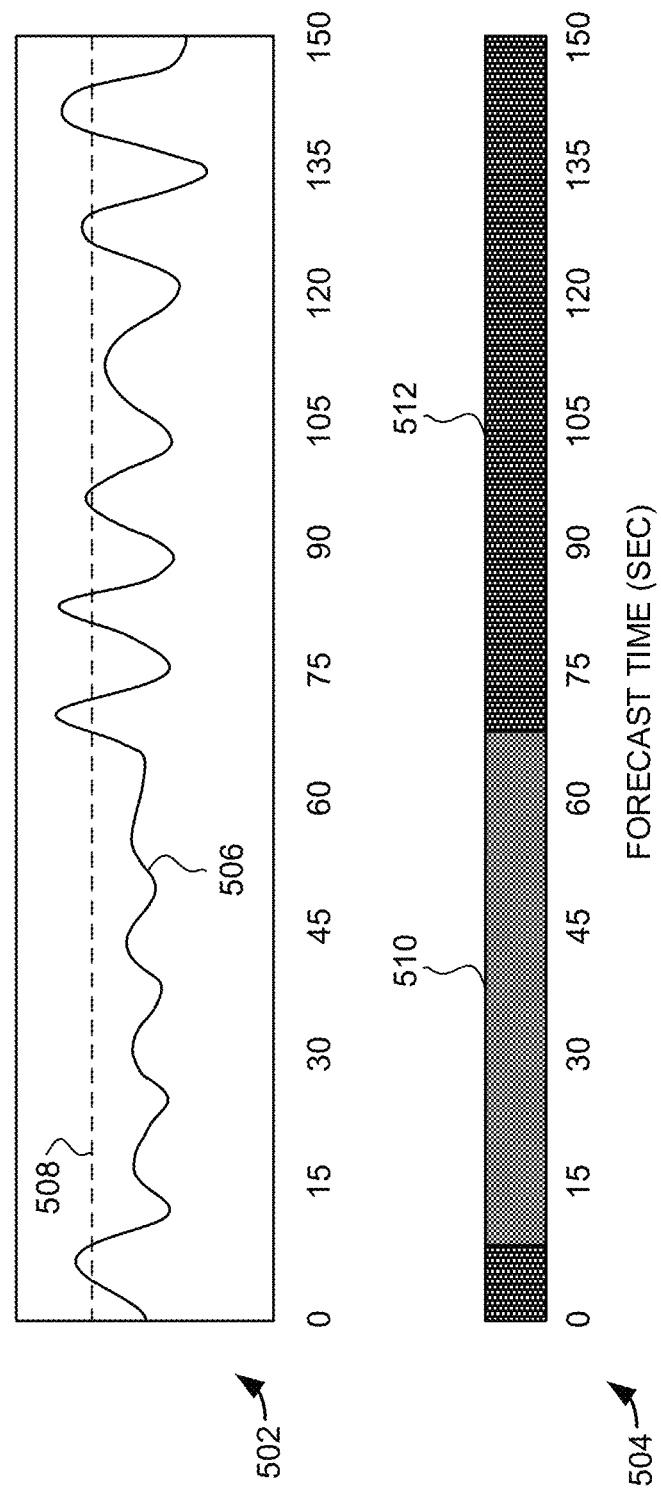

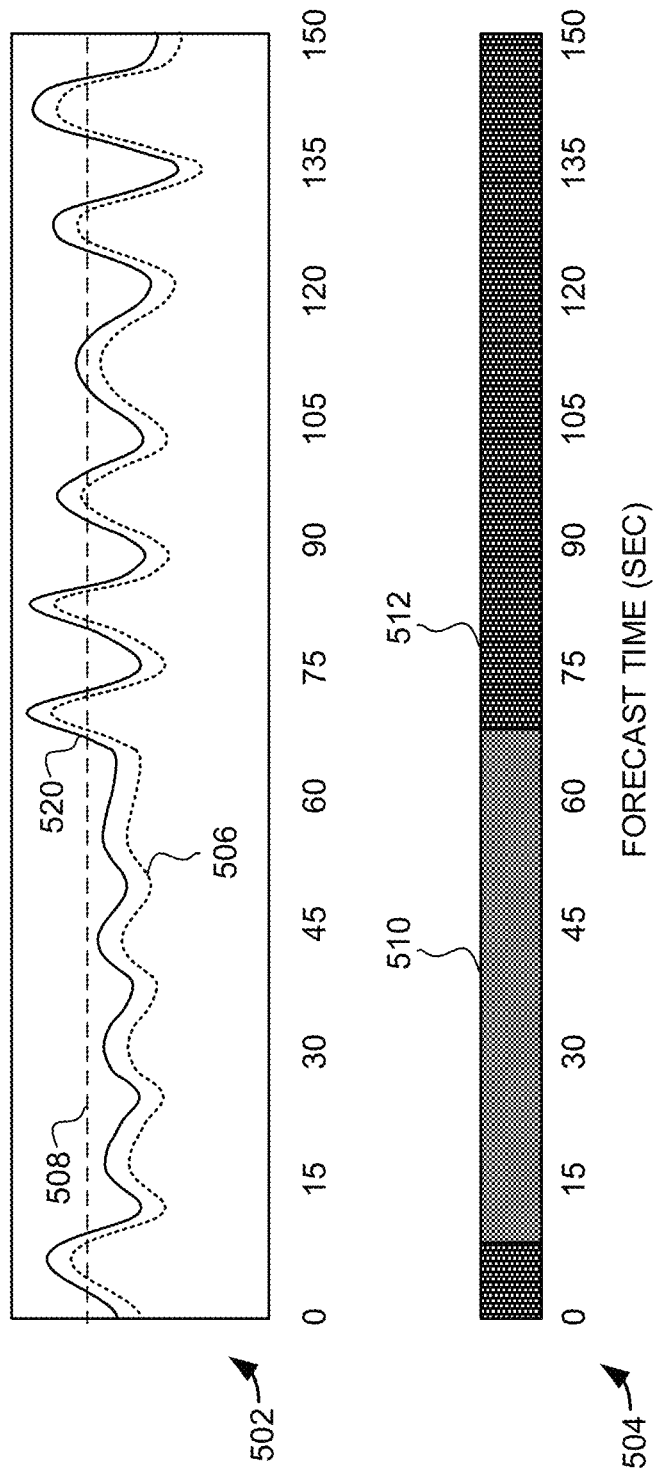

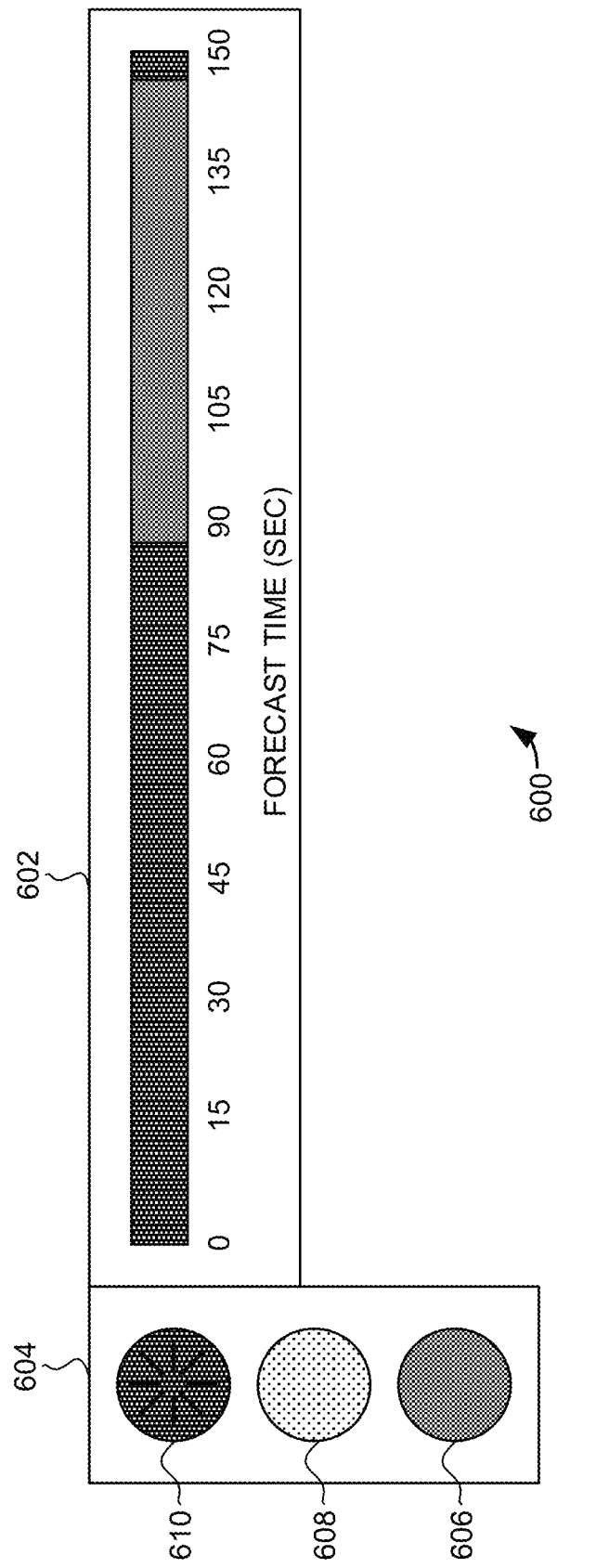

SYSTEMS AND METHODS FOR WAVE SENSING AND SHIP MOTION FORECASTING WITH OPERATIONAL PERIOD INDICATORS

TECHNICAL FIELD

The present invention generally relates to wave sensing, and more particularly relates to radar wave sensing, using the resultant determined wavefield to forecast ship motions, and the display of those forecasts to users for operational decisions.

BACKGROUND

Many ocean-based evolutions require and can benefit from detailed information about the sea-state and timing of waves and their impacts. For example, cargo transportation between ships can include the mooring of ships together offshore in order to transport cargo and equipment between them. These operations become challenging when there is relative motion between the ships due to ocean waves. Another example is launching and recovery a small boat where detailed timing information about incoming waves and the resultant ship motions can be used to reduce risks and increase operability. To overcome these challenges there is a need for sensing waves in the proximity of the ships and the generation of the resultant ship motion forecasts, then using these motion forecasts to provide detailed timing information for the user to make operational decisions.

BRIEF DESCRIPTION OF THE DRAWINGS

FIGS. 2A and 2B are schematic diagrams of an exemplary ship with a ship motion forecasting system in accordance with various embodiments of the present invention;

FIGS. 4A and 4B are schematic diagrams of an exemplary graphical representation of ship motion forecasts in accordance with various embodiments of the present invention;

FIGS. 5A, 5B, 5C, 5D, and 5E are schematic diagrams of an exemplary graphical representation of ship motion forecasts in accordance with various embodiments of the present invention;

FIGS. 6A, 6B, 6C, 6D, 6E, 6F and 6G are schematic diagrams of an exemplary graphical representation of ship motion forecasts in accordance with various embodiments of the present invention;

DESCRIPTION OF EMBODIMENTS

Figure 1A:
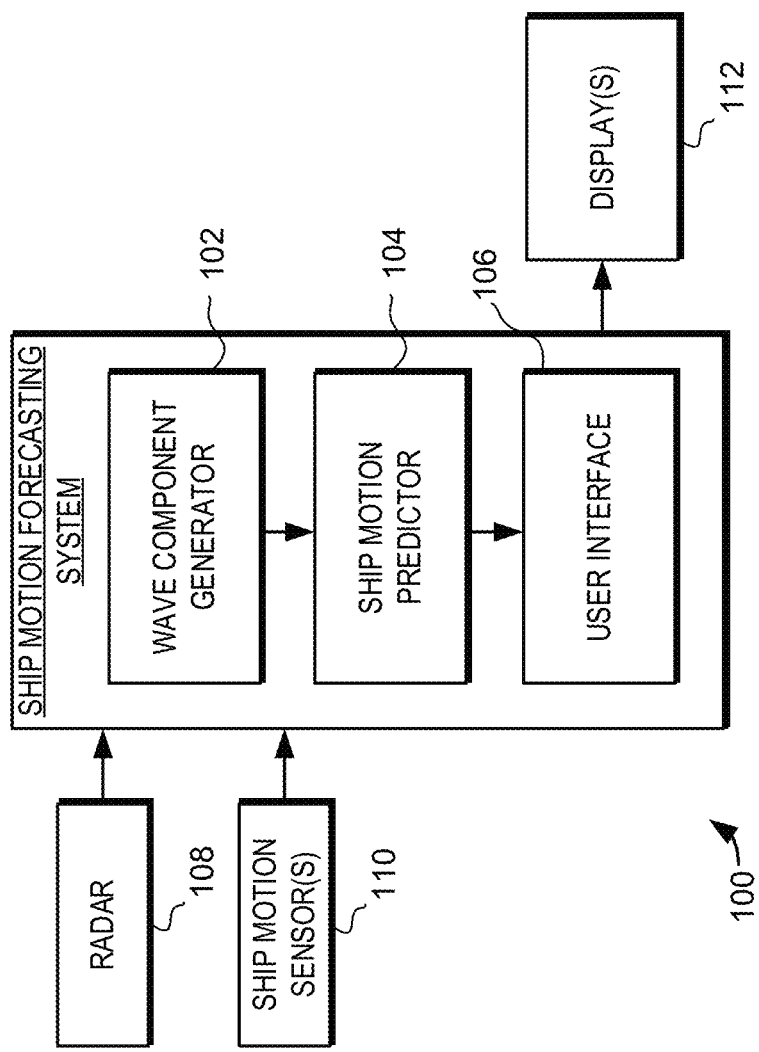
FIGS. 1A and 1B show schematic diagrams of ship motion forecasting system in accordance with various embodiments of the present invention.

The embodiments described herein provide systems and methods for providing and displaying forecasts of future ship motion. The embodiments described herein can enable accurate, near real-time forecasting of ocean waves and resultant vessel motions, and the useful displaying of such forecasts to users. Such systems and methods can be used to improve the efficiency and safety of a variety of ship operations.

In general, the systems and methods described herein provide crewman and other users of a ship motion forecasting system with useful information regarding ship motion forecasts by generating graphical indications of the ship motion forecasts that can be displayed to the users. For example, the systems and methods can be implemented to generate ship motion forecasts over a plurality of forecast cycles and display operational period indicators based those ship motion forecasts and multiple thresholds.

Such an implementation allows a user to view ship motion forecasts in a way that can give unique and useful information to the user. Specifically, such an implementation allows a user to quickly determine when ship motion is likely to be below a selected threshold for at least a selected period of time. Thus, trained user can quickly ascertain when conditions are likely to be such that certain ship operations can be safely performed. For example, a trained user can quickly determine when ship motion will be such that a cargo operation that typically takes 45 seconds can be performed. Thus, these indications can allow a user to make more informed operational decisions based on those forecasts.

In general, the systems and methods transmit radar signals that are reflected off the surface of a body of water. The reflected radar signals are received, and radar data is generated from the received radar signals. The radar data is used to generate ocean wave components, which represent the amplitude and phase of a multitude of individual waves that together can describe the surface of the ocean. These ocean wave components are then used to estimate future applied forces on a ship on the body of water. The estimate of future applied forces is then used to generate ship motion forecasts with respect to ship heading and speed. These forecasts can then be presented to one or more users in the form of operational period indicators. For example, the operational period indicators can be generated based on multiple thresholds. Specifically, graphical indicators of ship motion forecasts can be generated such that the ship motion forecasts under a motion threshold for a time period exceeding a time threshold are graphically indicated in a first way, while ship motion forecasts not under the motion threshold for the time period exceeding the time threshold are graphically indicated in a second way, different from the first way. Such graphical indications can be displayed to ship operators and used by those operators to determine when operations can be safely performed. Thus, the systems and methods described herein can facilitate improved safety in complex ship operations.

For example, the graphical indications can be displayed to ship operators to indicate when ship cargo operations can be safely performed, such a ship-to-ship cargo transfers. Other examples of ship operations for which indicators can be generated include, asset launch and recovery, personnel transfers, construction and assembly operations, etc. Additionally, such indicators can be used to facilitate sea-state assessments during low visibility conditions, provide stability monitoring, and facilitate autonomous vessel operations, provide feed-forward data to active systems (e.g. dynamic positioning systems, active motion compensation systems, etc.) and data recording for incident investigation and best practice review.

Turning now to FIG. 1A, a schematic diagram of an exemplary ship motion forecasting system 100 is illustrated. The ship motion forecasting system 100 includes a wave component generator 102, a ship motion predictor 104, and a user interface 106. In general, the ship motion forecasting system 100 receives radar data from radar(s) 108 and ship motion data from the ship motion sensor(s) 110.

The ship motion sensor 110 provides measurement data of ship motions for an associated ship or ships. For example, the ship motion sensor 110 can provide ship motion measurements for one or more of the six degrees of freedom (pitch, heave, roll, sway, surge and yaw) in which a ship can move. Such motion measurements can be used by the ship motion forecasting system 100 to provide an initial kinematic state or state history of the ship from which the impact of future waves can be determined. Additionally, in some embodiments the ship motion sensor 110 or other sensors and systems can provide ship tracking direction and ship location information. For example, Global Positioning System (GPS) systems and/or orientation devices (e.g. Inertial Measurement Unit (IMU)) can provide ship direction and tracking information to the ship motion forecasting system 100.

The radar 108 provides radar data to the ship motion forecasting system 100. Using this radar data and the data from the ship motion sensor 110, the ship motion forecasting system 100 generates ship motion forecasts that predict the future motion of one or more ships. Specifically, the wave component generator 102 is configured to receive the radar data from the radar 108 and generate the ocean wave components that describe waves likely to impact the ship. The ship motion predictor 104 uses these ocean wave components to generate ship motion forecasts.

In general, the ocean wave components are numerical representations of wave characteristics, and thus can include numerical representations of the wave height (e.g., amplitude) and wave timing (e.g. phase) of discrete wave frequencies and directions on a portion of the water surface. These ocean wave components can collectively be used to characterize the surrounding wave field on the water surface at the present and for the near term future. These ocean wave components can thus provide phase-resolved ocean surface height representations of waves on the water surface that can be used to generate real time ship motion prediction. Such phase-resolved ocean surface heights can be combined with time geographic (i.e., spatiotemporal) location information of the forecasted waves along with spectral (i.e., direction, period, and energy) information to generate ship motion forecasts.

The ship motion forecasts generated by the ship motion forecasting system 100 predict the future motion of the ship for at least one degree of freedom (pitch, heave, roll, sway, surge and/or yaw) and for determined period of time. These ship motion forecasts can be generated as discrete time-domain signals that extend from a current time to a future time. As one specific example, the ship motion forecasting system 100 can be implemented to predict and provide a time-domain signal forecasting heave for 30~180 seconds in future time with each new forecast. Additionally, the ship motion forecasting system 100 can be implemented to repeatedly generate these ship motion forecasts.

For example, the ship motion forecasting system 100 can be configured to generate a new ship motion forecast with each new processing cycle where new data is available from the radar(s) 108 and ship motion sensor(s) 110. In such an embodiment a new ship motion forecast would typically be generated every 1~3 seconds, with each new forecast providing a new prediction of ship motion for the following 30~180 seconds. These new forecasts can be displayed or otherwise outputted individually or in combination with past forecasts and other data.

In some embodiments the ship motion forecasting system 100 can be implemented to forecast future ship motions for a single ship in open water. In other embodiments the ship motion forecasting system 100 can be implemented to forecast future ship motions for two or more ships coupled together though a non-negligible mechanical coupling (e.g., rope and fender) or hydrodynamic forces. Furthermore, the ship motion forecasting system 100 can be implemented to predict ship motions for stationary ships, moving ships, or combinations of both. Furthermore, it should be noted the ship motion forecasting system 100 could be implemented to predict motion in any type of ship, including but not limited to large transport ships, roll-on roll-off ships, tankers, drilling vessels or platforms, construction vessels or platforms, supply vessels, production vessels or platforms, etc.

In some embodiments, the motion forecast system 100 can combine the generated ship motion forecasts with Meteorological and Oceanographic (METOC) numerical models and direct buoy observations to provide vessel operational planning guidance for longer time periods. For example, such systems can be implemented to provide operational planning for hours and days ahead, and can thus provide advanced planning to ship crews.

The user interface 106 is configured to generate one or more indications of the ship motion forecasts and display those indications on the display(s) 112. Again, in accordance with the embodiments described herein, these indications generated on the display 112 can take the form of operational period indicators based on multiple thresholds. Specifically, graphical indicators of ship motion forecasts can be generated such that the ship motion forecasts under at least one motion threshold for a time period exceeding a time threshold are indicated in a first way, while ship motion forecasts not under the at least one motion threshold for the time period exceeding the time threshold are graphically indicated in a second way, different from the first way. Again, the ship motion forecasts used to generate the operational period indictors can include of ship motion forecasts in one or more of the six degrees of freedom (pitch, heave, roll, sway, surge and yaw). Finally, it should be noted that other types of indications of ship motion forecasts can be outputted to the display(s) 112 and provided to a user.

Figure 1B:
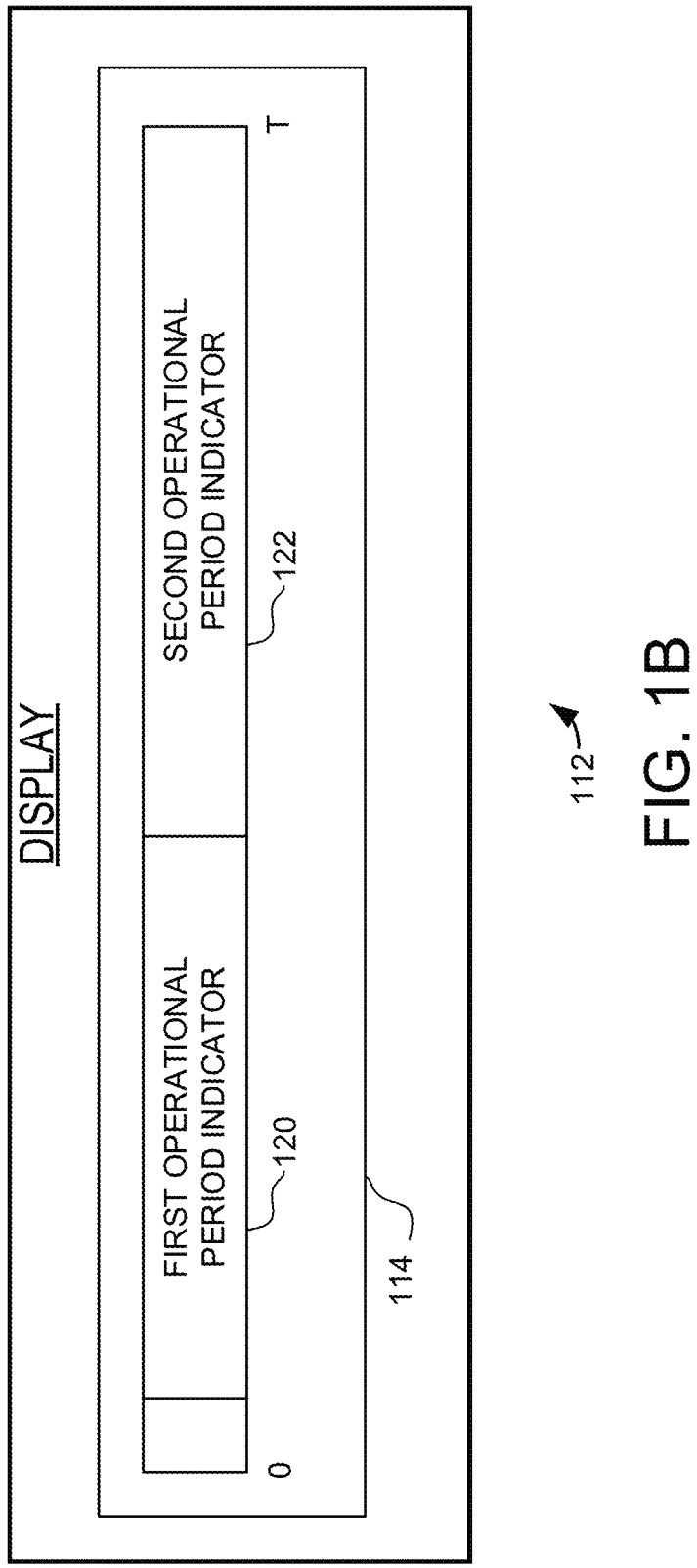

Turning now to FIG. 1B, a schematic diagram of the display 112 is illustrated. The display 112 is displaying a window portion 114 generated by the ship motion forecasting system 100. In accordance with the embodiments described herein, the window portion 114 includes operational period indicators that are generated based on multiple thresholds. Specifically, the window portion 114 includes a first operational period indictor 120 and a second operational period indicator 122. The first operational period indicator 120 identifies a first time period for which the ship motion forecasts are under one or more motion thresholds for a time period exceeding a time threshold. In contrast, the second operational period indicator 122 identifies a second time period for which the ship motion forecasts are not under the motion threshold(s) for the time period exceeding the time threshold. Notably, the first operational period indicator 120 displays the first time period in a different way than the second operational period 122 displays the second time period. Thus, with a quick glance a user can quickly determine the operational status from the current time (labeled 0) to a set future time (labeled T). A user can thus quickly determine if a suitable time period for ship operations is projected to occur in the near future.

As noted above, the first operational period indicator 120 indicates a first time period for which the ship motion forecasts are under a motion threshold for a time period exceeding a time threshold. Thus, the first operational period indicator 120 identifies a time period in which the ship motion is likely to be below a specified amount (defined by one or more motion thresholds) for at least a certain minimum time period (defined by a time threshold). Thus, the first operational period indicator 120 can identify a current or future time period in which it is predicted that certain ship operations may safely be performed. In contrast, the second operational period indicator 122 indicates a second time period for which the ship motion forecasts are not under the motion threshold for the time period exceeding the time threshold. Thus, the second operational period indicator 122 indicates that during this time period at least one motion forecast exists that is above a corresponding motion threshold such that there is insufficient time to safely perform the operation.

As discussed above, in some embodiments multiple motion thresholds can be used in generating first operational period indictor 120. In such an embodiment the ship motion forecasting system can generate forecasts of motion in multiple degrees of freedom (e.g., pitch, heave, roll, sway, surge and yaw) and can compare the forecasts for motion in each of the different degrees of freedom to a corresponding motion threshold. For example, a ship motion forecasting system can generate forecasts for both pitch and heave, and can compare the forecasts for pitch to a pitch motion threshold and can compare the forecasts for heave to a heave motion threshold. Thus, in this embodiment the first operational periodic indicator 120 would be generated only when forecasts for both degrees of freedom are under their respective thresholds for an overlapping time period that exceeds the time threshold. Detailed examples of such an embodiment will be discussed below with reference to FIG. 5E.

Furthermore, in some embodiments other factors can be used in generating first operational period indictor 120. For example, in some embodiments it may be desirable to use wave height forecasts in addition to ship motion forecasts in determining when ship operations are safe to be commenced. In such an embodiment the wave height forecasts used to generate ship motion forecasts can be compared to corresponding wave height thresholds. Thus, only when both ship motion forecasts and wave height forecasts are under their respective thresholds for the time period exceeding the time threshold would the first operational period indicator 120 be generated. The first operational period indicator 120 would thus be generated additionally in response to the wave height forecasts being under the wave height threshold.

It should be noted that the window portion 114 can typically include additional period indicators, with the number of period indicators displayed at a current time determined by the current motion forecasts and the future time for which such forecasts are generated and displayed.

For example, in some embodiments a third operational period indicator can be included in the window portion 114 to indicate situations where the current time period was initially longer and above the time threshold, but as time has continued to progress the remaining portion of that time period is now below the time threshold. Such an example will be discussed in greater detail below with reference to FIG. 4B.

In other embodiments, operational time periods that are under the motion threshold but for a time period that is not greater than the time threshold can be indicated in a different way compared to time periods that are under the motion thresholds for sufficient time. For example, different shapes of colors can be used to differentiate such time periods.

In some embodiments, confidence margins can be used in generating first operational period indictor 120. As will be described below, a variety of statistical techniques can be used to generate the ship motion forecasts. A result of these techniques is that the ship motion forecasts can have different levels of certainty depending on a variety of factors. To compensate for this uncertainty confidence margins can be added to the ship motion forecasts and the resulting adjusted ship motion forecasts used to generate the operational period indicator 120. In some embodiments, these confidence margins can be calculated to achieve a desired level of certainty. For example, in one implementation confidence margins can be calculated to achieve certainty levels of one sigma (68.3%), two sigma (95.4%), or three sigma (99.7%). In each case, the confidence margins needed to achieve such certainty levels can be derived from deviations between forecasted and experienced motions. Furthermore, in some embodiments, the confidence margins are not a fixed variable, but rather can be a calculated interval based on several inputs.

In one example implementation, the confidence margins used by the ship motion forecasting system 100 may be user selectable. For example, in one implementation the user can be allowed to select confidence margins to achieve a desired level of certainty.

As was noted above, the window portion 114 is generated such that the first operational period indicator 120 is displayed in a different way than the second operational period 122. Thus, a user can visually distinguish between time periods as they are displayed in the window portion 114. As one example, the first operational period indicator 120 can have a different color than the second operational period indicator 122. As other examples, the first operational period indicator 120 can have a different intensity, brightness and/or luminance than the second operational period indicator 122. As other examples, the first operational period indicator 120 can have a different shading or hatching than the second operational period indicator 122.

In addition to generating a display output and window portion 114 with operational period indicators 120 and 122 it may be desirable to generate other notifications in response to the ship motion forecasts. For example, in some embodiments it may be desirable to provide visual or audio indications of when certain ship operations may be performed and when such should be stopped. As one specific example, colored lights on the ship deck can be selectively activated in response to ship motion forecasts being under the motion thresholds and for the various time thresholds. Likewise, an audio alarm can be generated when a safe operational time period is ending. Again, these are just examples of the type of other notifications that can be generated by the ship motion forecasting system 100.

Turning now to FIG. 2A, a side view of an exemplary ship 200 is illustrated with at least one radar 201 configured to transmit radar signals 202 toward the water surface 204, where that surface can include waves that are traveling toward the ship 200. These radar signals 202 reflect off the water surface 204, and the reflected radar signals 202 are received back at the ship 200 where they are used to determine a forecast of future ship motion.

In a typical implementation, the radar 201 antenna rotates while transmitting and receiving the radar signals 202, resulting in an azimuthal and range scan of the water surface 204. Turning now to FIG. 2B, this figure shows a top view of the ship 200 and illustrates an exemplary portion 205 of an azimuthal scan of a water surface. FIG. 2B shows how the portion 205 of the water surface scanned by the radar 201 can be considered to comprise a plurality of azimuthal sectors 206, of which three are illustrated in FIG. 2B. Furthermore, each of these azimuthal sectors 206 is made up of a plurality of area patches 208, of which three are illustrated in FIG. 2B. In this example, each patch 208 has the width of the arc of the corresponding azimuthal and a length determined by the range resolution of the radar. Thus, the area of each patch 208 is approximately the width of the azimuthal sector at the point of the patch multiplied by the range resolution. It should be noted that the example illustrated in FIG. 2B is a very simplified example, and in a typical implementation the radar scan could cover a much larger area, and the scanned water surface could be divided into many more azimuthal sectors 206, which each sector 206 including a very large number of patches 208. For example, with radar having a range of ~5000 meters and a range resolution of ~7.5 meters, the portion 205 could comprise azimuthal sectors each having an arc length of 2.5 degrees, with each sector having ~700 patches. Again, in this embodiment each patch would have an area that is approximately the width of the arc at that location multiplied by the range resolution (e.g., ~7.5 m). Where the radars provide a full 360 degree scan, such an embodiment could provide a total of ~144 azimuthal sectors 206 and ~100,000 patches 208. As will be described in greater detail below, the ship motion forecasting system can be configured to reflect radar signals off the portion 205 of the water surface and generate ocean wave components using applicable portions of the plurality of patches 208 in the plurality of azimuthal sectors 206.

Figure 3:
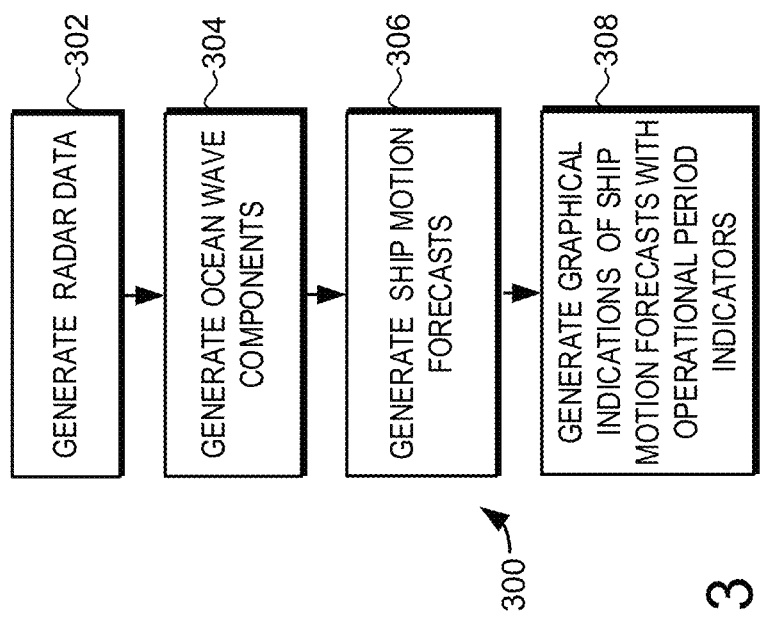
FIG. 3 is flow diagram of an exemplary ship motion forecasting method in accordance with various embodiments of the present invention.

Turning now to FIG. 3, a method 300 of determining ship motion forecasts is illustrated. The method 300 is exemplary of the type of process that can be used to generate ship motion forecasts in accordance with the embodiments described herein. In general, the method 300 uses radar to measure incoming waves and provide forecasts of ship motion that will result from these waves. It should be noted that in a typical implementation the method 300 can be performed repeatedly in cycles, with new ship motion forecasts being generated each cycle. For example, a new radar scan of the water surface and resulting ship motion forecasts can be generated every 1-3 seconds dependent upon radar scanning interval, update frequency, and processor latency.

The first step 302 is to generate radar data using radars. As was described above, the radar data can include data for each of a plurality of patches, where each patch corresponds to one portion of an azimuthal sector of the water surface. To generate this radar data one or more radars are used to transmit radar signals toward the water surface. The radar signals reflect off the water surface and are received back at the radar, where the reflected radar signals are used to generate the radar data.

Additionally, a variety of different types of radars can be used in the ship motion forecasting system. For example, the radars can be implemented with X-band Doppler radars. For example, a 2 kilowatt coherent X-band radar with an antenna mounted 30 meters above the water surface can provide accurate Doppler (i.e. frequency-shift) sensing to 5 kilometers, enabling a 5 minute ship motion forecast capability. In such an embodiment the radar can be configured to have an azimuthal resolution of ~2.5 degrees and range resolution of ~7.5 meters, and an azimuthal scanning interval of less than 3 seconds. This can result in ~30,000 scanning patches of sizes of 30~1000 square meters being processed per second. As one specific example, the radars can be implemented with marine X-Band (9.4 GHz) Doppler radars. Such radars can be implemented to measure the ocean surface orbital radial-velocities through the Bragg backscattering in an area around the vessels out to several thousand meters. Of course, these are just some examples and other implementations are possible.

Again, the radar signals reflect off the water surface and are received back at the radar, where the reflected radar signals are used to generate the radar data. The next step 304 is to generate ocean wave components from the received radar data. Again, the ocean wave components are numerical representations of wave characteristics, and thus can include numerical representations of the wave height (e.g., amplitude) and wave timing (e.g. phase) of discrete wave frequencies and directions on a portion of the water surface. These ocean wave components can be generated from the radar data for tens-of-thousands of patches per second, where again each patch is a portion of the surface that can be moving a result of the multitude of waves that comprise the surface at any particular time. In general, step 304 determines the ocean wave components that are most consistent with the radar data and will thus describe the overall wave field on the water surface.

In a typical implementation new ocean wave components would be generated for each new wave forecast, with each new wave forecast corresponding to new scans of the radar made during one processing cycle, typically a second or two.

Because the typical wave field does not change rapidly on the time-scale of seconds newly generated wave components can be compared to previous wave components to further refine the component solution using statistical means. For example, consistency from one processing cycle to the next indicates accuracy, and averaging across processing cycles for the same wave component can improve the solution.

In a typical embodiment these ocean wave components would be generated only using patches of the water surface which contain waves that may impact the ship motion. This determination of likely impact can be made based on a known or estimated directional wave spectrum and the current ship speed and heading. Furthermore, this initial determination can be made before the ocean wave components are generated and thus can be used to reduce the number of components that need to be generated and thus reduce the amount of computing resources required. As will be described in greater detail below with reference to FIG. 7, such a process can determine which portions of the water surface contain waves that are likely to generate significant ship motion by first generating moment data and then filtering the moment data.

The next step 306 is to generate ship motion forecasts from the ocean wave components. These ship motion forecasts can include ship motion forecasts in one or more of the six degrees of freedom (pitch, heave, roll, sway, surge and yaw) that ship motion can occur in. In some embodiments, the ship motion forecasts can be generated as statistical representations of expected ship motions for various ship courses and speeds. In other embodiments, the ship motion forecasts can provide precise time-specific predictions of ship motion.

In general, these ship motion forecasts can be generated by determining the forces that will be applied to the ship by each of various wave components that will impact the ship, and combining the results. Again, in a typical embodiment new ship motion forecasts would be generated for each forecast cycle.

In one specific embodiment, a reduced-order model (ROM) for ship motions can be used to determine the ship motions. For example, a reduced-order lumped-parameter time-domain model for ship motions can be used. Such a model can be used with Cummins equation approach to provide the desired computational speed for generating future ship motion predictions. In the Cummins equation motions of one or multiple (N) ships is represented as a 6×N degree-of-freedom system represented by 6×N equations. The formulation uses the state as an initial condition in a time-domain solution, and the state history is used in a convolution with pre-calculated impulse-response functions. An example of such a model can be found at "Development of an Environmental and Ship Motion Forecasting System" by Benjamin S. H. Connell et al, Proceedings of the ASME 2015 34$^{th}$ International Conference on the Ocean, Offshore and Artic Engineering.

Such a model can be used to calculate ship motions for particular ships or particular multi-ship arrangements. The necessary added inertia and hydrostatic restoring terms are pre-calculated from a representation of the ship geometry and input mass specifications. The impulse-response functions and force response amplitude operator functions are pre-calculated through a discretized range of speeds, and wave frequencies and directions, yielding a database which characterizes the hydrodynamic forcing to the ship through all relevant operating conditions. Particular values of these forcing functions are obtained through interpolation of values from the database. The approach uses the assumptions of linear seakeeping theory, where the hydrodynamic forcing can be decomposed into the incident wave, diffraction and radiation forces. The pre-calculated wave-forcing database allows mapping of the discrete wave components to modal forcing of the ship system. Thus, resultant vessel motions for different courses and speeds can be calculated for the recommendation model. This lookup database can then be used during operation of the forecasting system to provide the ship motions that will result from the waves that are forecast to impact the ship.

During operation the generated ocean wave components can then be used as real time inputs to the lookup database, with the lookup database providing necessary terms to calculate the resulting forecasts of ship motions. As one example, the lookup database can provide the coefficients for the Cummins equation that describes the motions of the one or more ships that motions are being forecast for in the particular implementation of the ship forecasting system. Thus, the lookup database with pre-calculated values can be used to provide fast determinations of ship motion forecasts. This can facilitate the real time determination of several minutes of ship motion forecasts for each radar scan and each cycle of wave component calculation.

The next step 308 is to generate graphical indications of ship motion forecasts with operational period indicators. In general, the generated graphical indications with operational period indicators can be outputted to a display (e.g., display(s) 112). Furthermore, the graphical indications with operational period indicators can be combined with any other type of graphical or other representation of the ship motion forecasts on the display.

Again, these graphical indications of ship motion forecasts can include indications generated from ship motion forecasts in one or more of the six degrees of freedom (pitch, heave, roll, sway, surge and yaw).

Turning now to FIG. 4A, a schematic diagram of an exemplary display screen window 400 is illustrated. The display screen window 400 is an example of the type of graphical indications that could be generated in step 308 of method 300.

The display screen window 400 includes operational period indicators that are generated based on multiple thresholds. Specifically, the display screen window 400 includes a first operational period indictor 402 and a second operational period indicator 404.

The first operational period indicator 402 indicates a first time period for which the ship motion forecasts are under at least a motion threshold for a time period exceeding a time threshold. Thus, the first operational period indicator 402 identifies a time period in which the ship motion in at least one degree of freedom is forecast to be below the amount specified by at least a motion threshold for at least the minimum time period specified by the time threshold. In this illustrated example, the time threshold is set at value less than 61 seconds. Also, in this illustrated example, the time period indicated by the first operational period indicator 402 extends from ~17 seconds to ~78 seconds in the future. Thus, the first operational period indicator 402 identifies this future time period as one that is forecast to be acceptable for certain ship operations to be performed. In contrast, the second operational period indicator 404 indicates a second time period for which the ship motion forecasts for at least one degree of freedom are not under the corresponding motion threshold for the time period exceeding the time threshold. Thus, the second operational period indicator 404 indicates that during this time period at least one motion forecast exists that is above the corresponding motion threshold such that there is predicted to be insufficient time to safely perform the operation. In this illustrated example, the time period indicated by the second operational period indicator 404 extends from 0 (the current time) to ~17 seconds in the future, and from ~78 seconds to 150 seconds.

Notably, the first operational period indicator 402 displays the first time period in a different way than the second operational period 404 displays the second time period. In this figure the different ways are illustrated with different cross hatchings, and these cross hatchings are meant to represent any suitable method of distinguishing the periods (e.g., color, brightness, luminance, etc.) Thus, with a quick glance a user can quickly determine the status from the current time (i.e., 0 seconds) to a future time (i.e., 150 seconds), and can quickly determine if a suitable time period for ship operations is likely to occur in the near future.

As a specific example, the first operational time period indicator 402 can colored green while the second operational time period 404 can be colored red. Such a coloring scheme can naturally indicate to a user when operations should be performed and when such operations should not be performed.

In the illustrated example the first operational period indicator 402 and the second operational period indicator 404 are implemented as rectangular bars with their horizontal axis corresponding to the future time period represented by the indicator. However, this is just one example, and other shapes and orientations can be used.

In a typical embodiment, a new motion forecast would be generated each cycle, e.g., for each processing cycle. Thus, for each cycle a new ship motion forecast is generated, and the new forecast can then be used to update the display screen window 400. Thus, if new forecasts result in increased or decreased amounts of ship motion forecast, the first operational period indicator 402 and the second operational period indicator 404 can be updated accordingly.

In updating the first operational period indicator 402 and the second operational period indicator 404 these new forecasts can be averaged with or otherwise combined with previous forecasts. Alternately, new forecasts can simply replace older forecasts and the first operational period indicator 402 and the second operational period indicator 404 regenerated and replaced accordingly.

During a typical operation the detected wave components move as time progresses, and the period indicators 402 and 404 would appear to move across the display screen window 400.

Specifically, as time progresses waves continue to propagate and forecasts of future ship motion effectively become closer in time. Thus, a wave event that is predicted to impact a ship and cause motion at some time in the future will move closer spatially and temporally over time. Thus, the period indicators 402 and 404 would typically appear to be move across the display screen window 400 as time progresses.

Figure 4B:
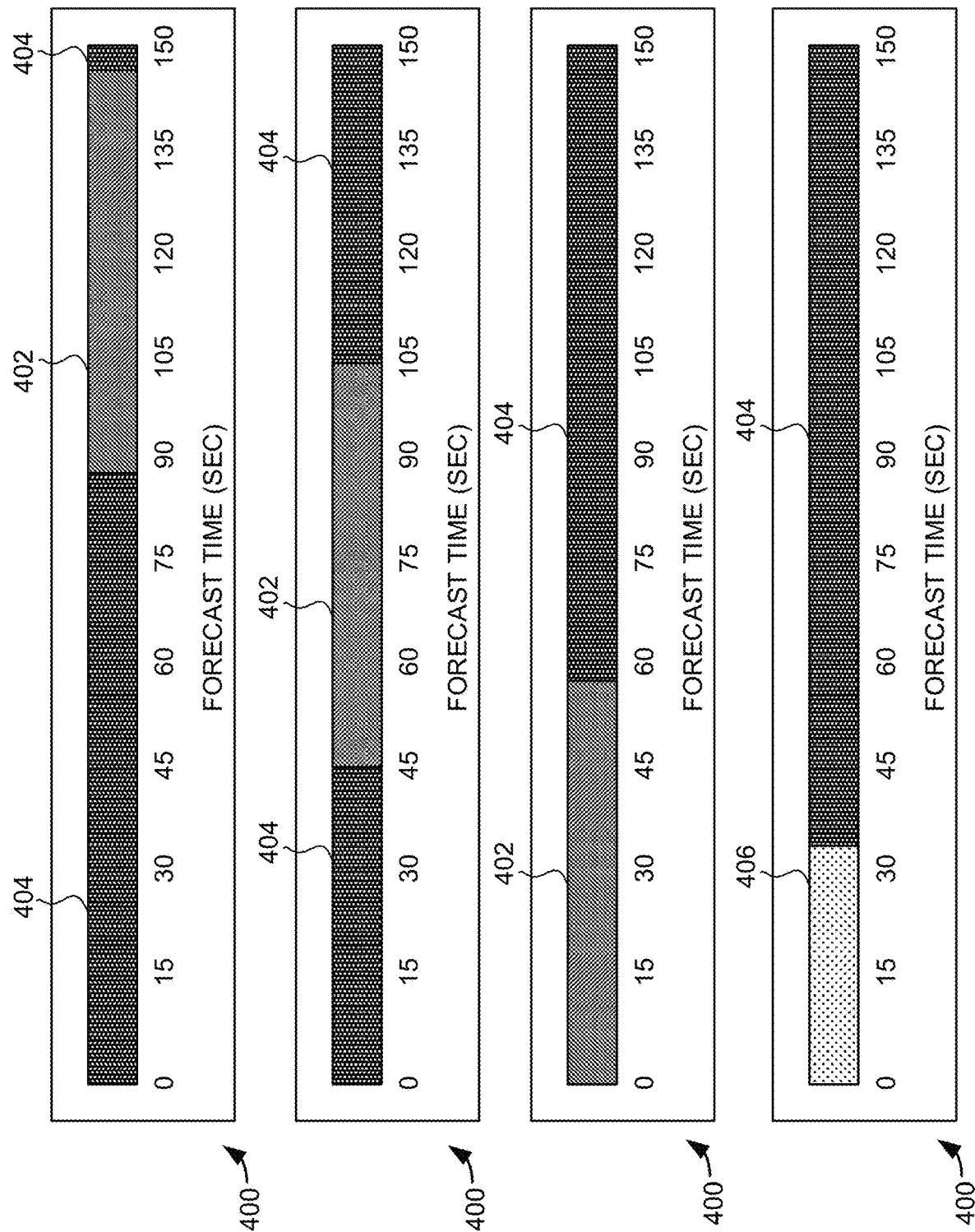

Turning now to FIG. 4B, four example instances of the display screen window 400 are illustrated. Specifically, these four example instances of the display screen window 400 represent example changes that occur in the period indicators as time progresses.

In the first example, the first operational period indicator 402 extends from ~87 seconds to ~145 seconds in the future, with the remaining time part of the second operational period 404. The second example illustrates ~40 seconds later in time, and thus in the second example the first operational period indicator 402 extends from ~45 seconds to ~105 seconds in the future. The third example illustrates ~47 seconds later in time from the second example, and thus in the third example the first operational period indicator 402 extends from the current time (0 seconds) to ~58 seconds in the future.

As can be seen in these first three examples, as time progresses the period indicators 402 and 404 naturally move across the display screen window 400 as time progresses. However, it should be noted that this is just an example, and in other usage cases such a progression would not always occur. For example, in some cases changes in the future motion forecasts can interrupt this progression across the display screen window 400. Specifically, if a new forecast now predicts that future motion will be above the threshold during the time previously indicated by the first operational period indicator 402 the progression across the display screen window 400 can be interrupted.

Moving to the fourth example of FIG. 4B, this illustrates a specific case where the current time period was initially above the time threshold but as time has progressed the remaining portion of that time period is now below the time threshold. In some embodiments such a remaining time period can be indicated differently in the display screen window 400.

Specifically, in the illustrated embodiment of FIG. 4B the current time period was initially longer and above the time threshold, and thus as shown in the first three examples it was previously indicated with the first operational period indicator 402. But as time has continued to progress the remaining portion of that time period is now below the time threshold, and in this illustrated embodiment such a current time period is now indicated with a third operational period indicator 406.

In this case the fourth example is from ~14 seconds later in time compared to the third example, and thus in the fourth example the third operational period indicator 406 extends from the current time (0 seconds) to ~33 seconds in the future. Thus, the third operational period indicator 406 indicates a time that was initially indicated by the first operational period indicator 402 but is now shorter because a portion of that time period has already passed. In this embodiment the display screen window 400 is implemented to use a third operational period indicator 406 to indicate such partial time periods that are now under the time threshold in length. This third operational period indicator 406 can be displayed in a third way different from the first way and the second way used to display the other indicators. As a specific example, where the first operational time period indicator 402 was colored green and the second operational time period 404 colored red, a third operational can be colored yellow. Such a coloring scheme can thus use the yellow color to indicate to a user that operations which have already started should be completed but no new operations should be started.

Turning now to FIG. 5A, another example of a display screen window 500 is illustrated. In this example the display screen window 500 includes a time-domain representation 502 and an operational indicator representation 504. The time-domain representation 502 and the operational indicator representation 504 are examples of the type of graphical indications that could be generated by a ship motion forecasting system 100 or in step 308 of method 300. As with the previous examples, the operational indicator representation 504 includes at least a first operational period indicator 510 and a second operational period indicator 512.

The first time-domain representation 502 shows a ship motion forecast for one degree of freedom (e.g., a selected one of the six degrees of freedom). In this example the first time-domain representation 502 shows a generated ship motion forecast 506 for the next 150 seconds (i.e., from time 0 to time 150). The first time-domain representation also illustrates a motion threshold 508. The motion threshold 508 is an example of the type of threshold that can be used to determine if cargo or other operations can safely be performed. Specifically, the motion threshold 508 is an example of a threshold that can be used to identify time periods in which the ship motion in at least one degree of freedom is forecast to be below a specified amount for at least a minimum time period specified by a time threshold.

The motion threshold 508 can thus be used to determine the operational period indicators 510 and 512. Specifically, the first operational period indicator 510 indicates a first time period for which the ship motion forecasts are under the motion threshold 508 for a time period exceeding a time threshold. In this illustrated example, the time period indicated by the first operational period indicator 510 extends from ~8 seconds to ~68 seconds in the future. Thus, the first operational period indicator 510 identifies this future time period as one that is forecast to be acceptable for certain ship operations to be performed.

In contrast, the second operational period indicator 512 indicates a second time period for which the ship motion forecasts for at least one degree of freedom are not under the corresponding motion threshold for the time period exceeding the time threshold. In this illustrated example, motion forecasts above the motion threshold occur at ~68 seconds, ~80 seconds, ~95 seconds, ~128 seconds, and ~140 seconds. It should be noted that while there is a relatively long time period between the motion forecasts exceeding the motion threshold 508 at ~95 seconds and at ~128 seconds that this time period is still shorter than the time threshold, and thus the entire period is indicated as unsuitable for motion sensitive operations by the second operational period indicator 512.

Figure 5B:
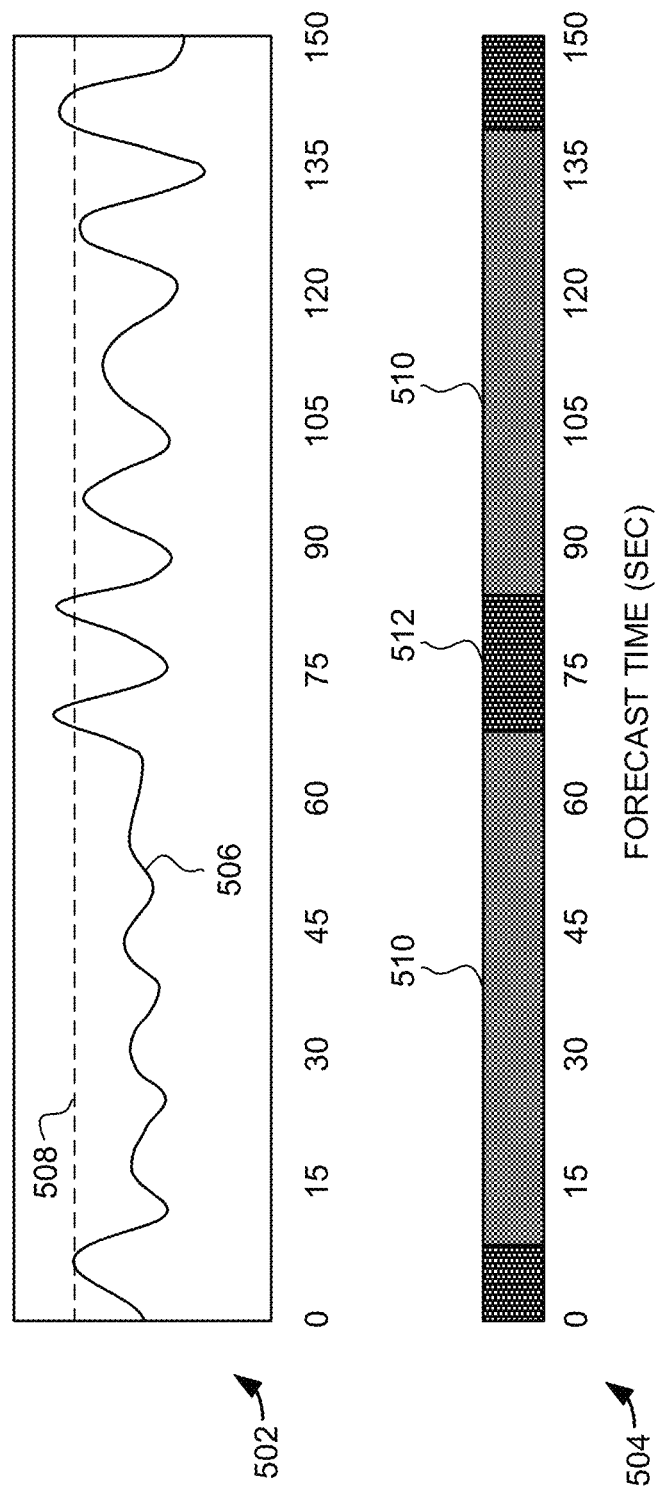

Turning now to FIG. 5B, another example of the display screen window 500 is illustrated. In this example the motion threshold 508 is set higher than that of FIG. 5A. The motion threshold 508 determines what time periods are deemed suitable for operations, and thus changing the motion threshold 508 can change what future times will be indicated as such. In this example the motion threshold 508 is higher and there are now two first operational period indicators 510. Each of the first operational period indicators 510 indicates a time period for which the ship motion forecasts are under the motion threshold 508 for a time period exceeding a time threshold, and are those forecast to be suitable for certain ship operations. In this illustrated example, the time period indicated by the first operational period indicator 510 extends from ~8 seconds to ~68 seconds and extends again from ~84 seconds to ~140 seconds in the future.

Turning now to FIG. 5C, another example of the display screen window 500 is illustrated. In this example a confidence margin is used in generating the first operational period indictor 510. As was described above, the statistical techniques used to generate ship motion forecasts can result in various levels of uncertainty in the forecasts. To compensate for this uncertainty a confidence margin can be added to the ship motion forecasts. In this illustrated example, an adjusted ship motion forecast 520 is generated by adding the confidence margin to the original ship motion forecast 506. As can be seen in FIG. 5C, the added uncertainty margin can change when the ship motion forecast 520 is above the motion threshold 508.

Figure 5D:
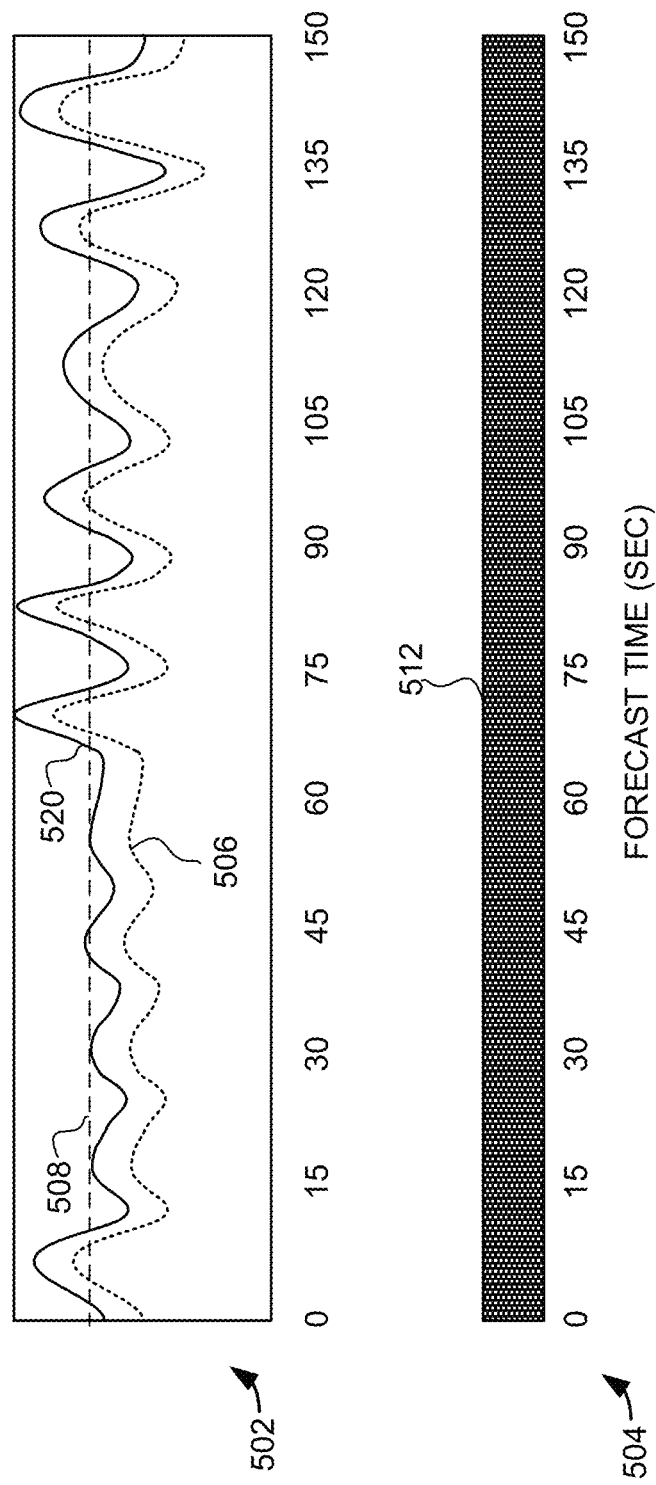

In some embodiments the confidence margin can be user selectable. For example, the user of the ship motion forecasting system can select a desired certainty level and thus select the confidence margin added to the ship motion forecast 506. In FIG. 5C the selected confidence margin can correspond to a certainty level of one sigma (68.3%). Turning to FIG. 5D, a second example is illustrated with a higher confidence margin added to the ship motion forecast 506. In this case the selected confidence margin can correspond to certainty level of two sigma (95.4%). Thus, the adjusted ship motion forecast 520 is considerably higher than the example of FIG. 5C, and results in no time period for which the ship motion forecasts are under the motion threshold 508 for a time period exceeding a time threshold. Thus, the operational indicator representation 504 includes only a second operational period indicator 512.

Figure 5E:
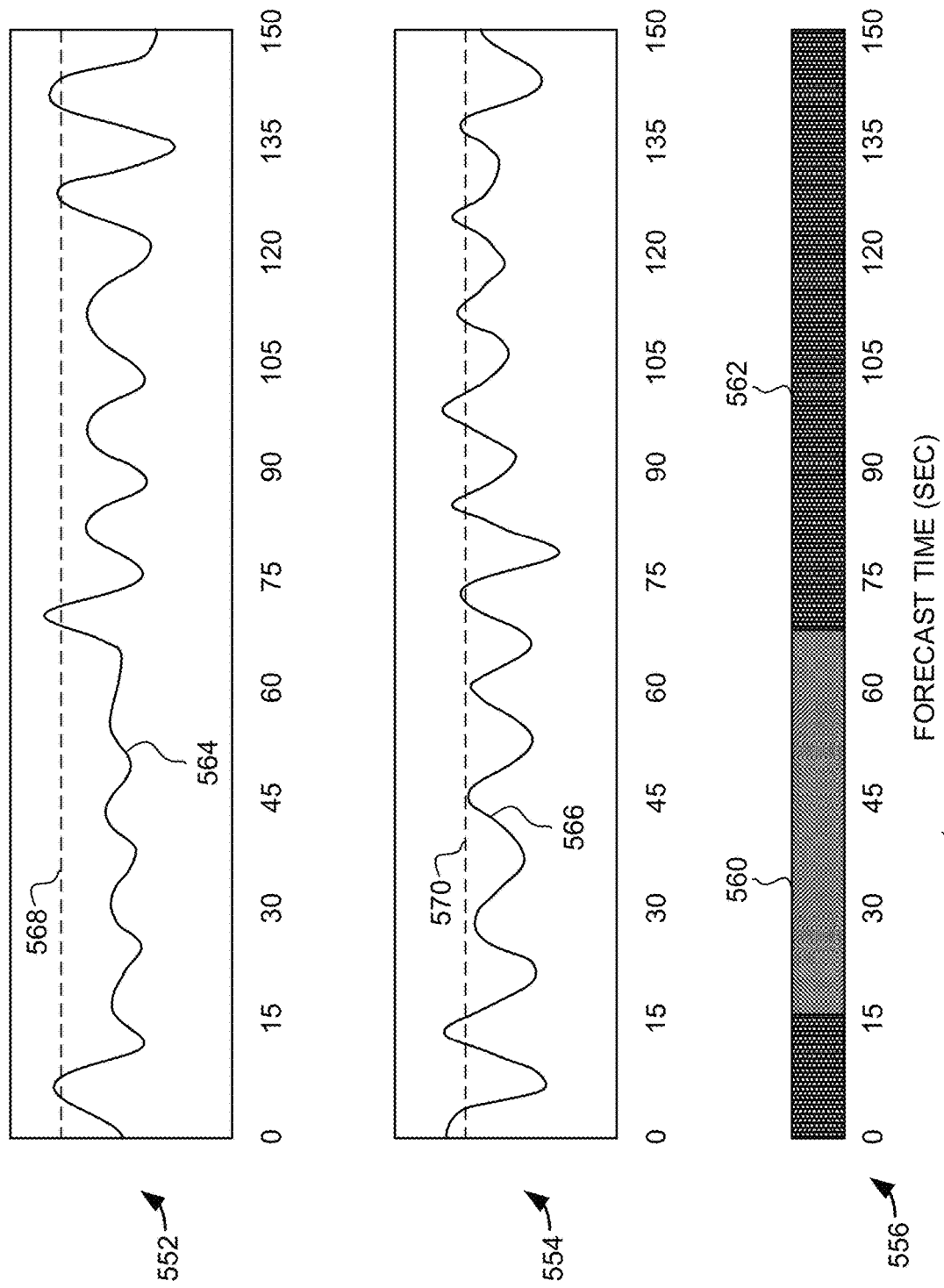

Turning now to FIG. 5E, another example of a display screen window 550 is illustrated. In this example multiple motion thresholds are used in the generating first operational period indictor. In such an embodiment the ship motion forecasting system generates forecasts of motion in multiple degrees of freedom (e.g., two or more of pitch, heave, roll, sway, surge and yaw) and compares the forecasts for motion in each of the those different degrees of freedom to a corresponding motion threshold.

The display screen window 550 illustrated in FIG. 5E includes a first time-domain representation 552, a second time-domain representation 554, and an operational indicator representation 556. As with the previous examples, the operational indicator representation 556 includes at least a first operational period indicator 560 and a second operational period indicator 562.

The first time-domain representation 552 shows a first ship motion forecast 564 for a first degree of freedom and a first motion threshold 568. The second time-domain representation 544 shows a ship motion forecast 566 for a second degree of freedom and a second motion threshold 570. In this example both ship motion forecasts 564 and 566 and both motion thresholds 568 and 570 are used to determine the operational period indicators 560 and 562. Specifically, the first operational period indicator 560 indicates a time period for which both the first ship motion forecast 564 is below the first motion threshold 568 and the second ship motion forecast 566 is below the second motion threshold 570 for an overlapping time period that exceeds the time threshold. It should be noted that thresholds 568 and 570 can be set independently of one another. Furthermore, different confidence levels can be for the different forecasts 564 and 566.

In this illustrated example, the time period indicated by the first operational period indicator 560 extends from ~15 seconds to ~68 seconds. In contrast, the second operational period indicator 562 indicates a second time period for which the either of the ship motion forecast 564 and 566 are not under the corresponding motion threshold for the time period exceeding the time threshold.

Figure 6B:
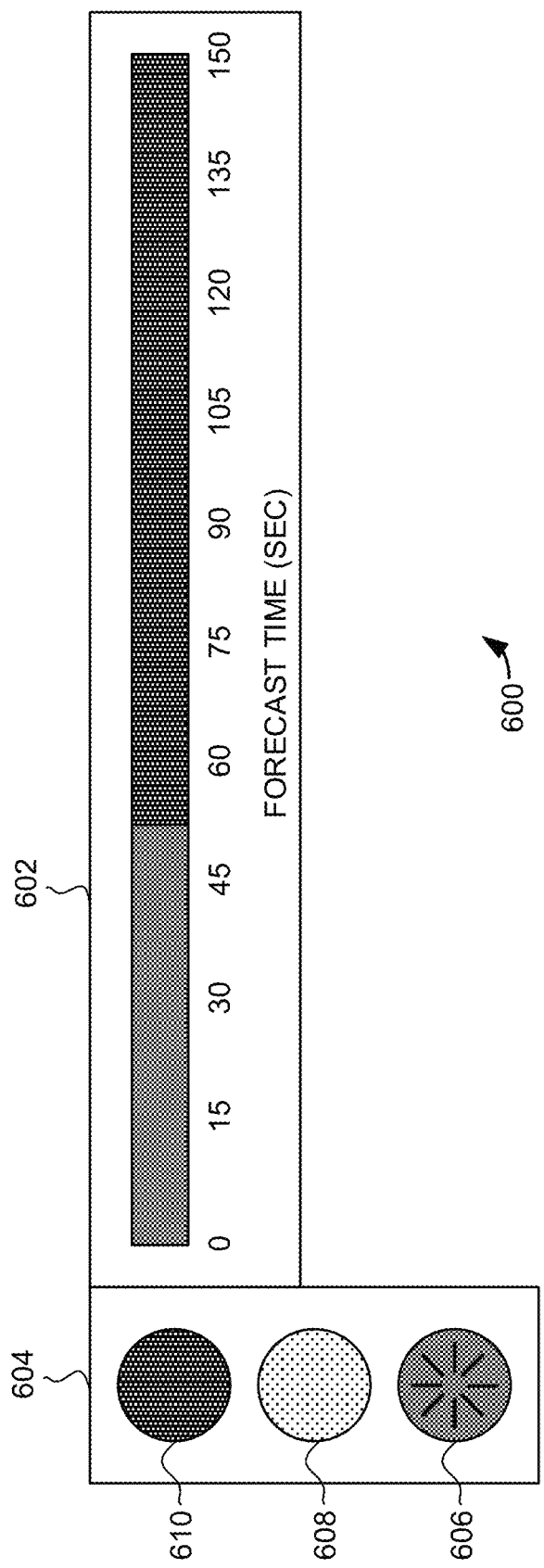
Figure 6C:
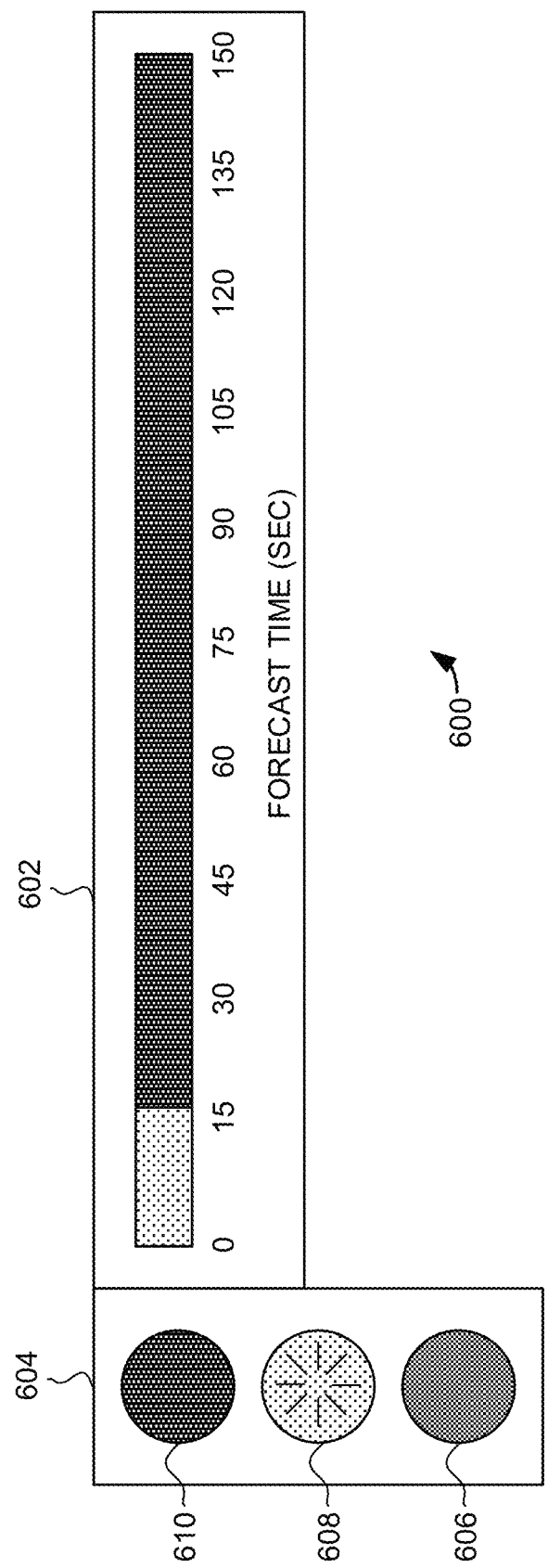

Turning now to FIGS. 6A-6C, schematic diagrams of another exemplary display screen window 600 are illustrated. In this illustrated example the display screen 600 includes a stoplight representation 604 in addition to operational period indicators 602.

In general, the stoplight representation 604 provides an indication of the current operational status based on the ship motion forecasts. As one specific example, the stoplight representation 604 uses the colors of stoplight to indicate when cargo and other ship operations can be performed.

In this illustrated embodiment, the third status indicator 610 is activated where at a current time period the ship motion forecasts are not under the at least one motion threshold for the time period exceeding the time threshold. This is illustrated in FIG. 6A. Likewise, the first status indicator 606 is activated where at the current time period the ship motion forecasts are under the motion threshold for the time period exceeding the time threshold. This is illustrated in FIG. 6B. Finally, the second status indicator 608 is activated when the current time period was initially above the time threshold but a currently remaining portion of the current time period is now below the time threshold. This is illustrated in FIG. 6C.

In a typical embodiment each of the status indicators 606, 608 and 610 would be implemented to represent its associated status in a different way. As examples, status indicators 606, 608 and 610 can be implemented with different colors, intensities, and/or textures. As one specific example, the status indicators 606, 608 and 610 can be implemented with green, yellow and red to mimic an actual stoplight. Thus, green first status indicator 606 would be activated when the current time period is one where ship motion forecasts are under the motion threshold for a time period exceeding the time threshold. Thus, green indicates that it is safe to proceed with cargo or other ship operations.

Likewise, the red third status indicator 610 would be activated when the current time current time period is one where ship motion forecasts are not under the motion threshold for the time period exceeding the time threshold. Thus, the red indicates that it is not safe to proceed with cargo or other ship operations.

Finally, the yellow second status indicator 608 would be activated when the current time period is one that was initially above the time threshold but as time has progressed such that the remaining portion of that time period is now below the time threshold. Thus, yellow indicates that current operations should be completed, but that it is likely unsafe to begin new operations.

Finally, it should be noted that while in this example the stoplight representation 604 includes three status indicators 606, 608 and 610 other embodiments could include more or fewer status indicators.

Figure 6D:
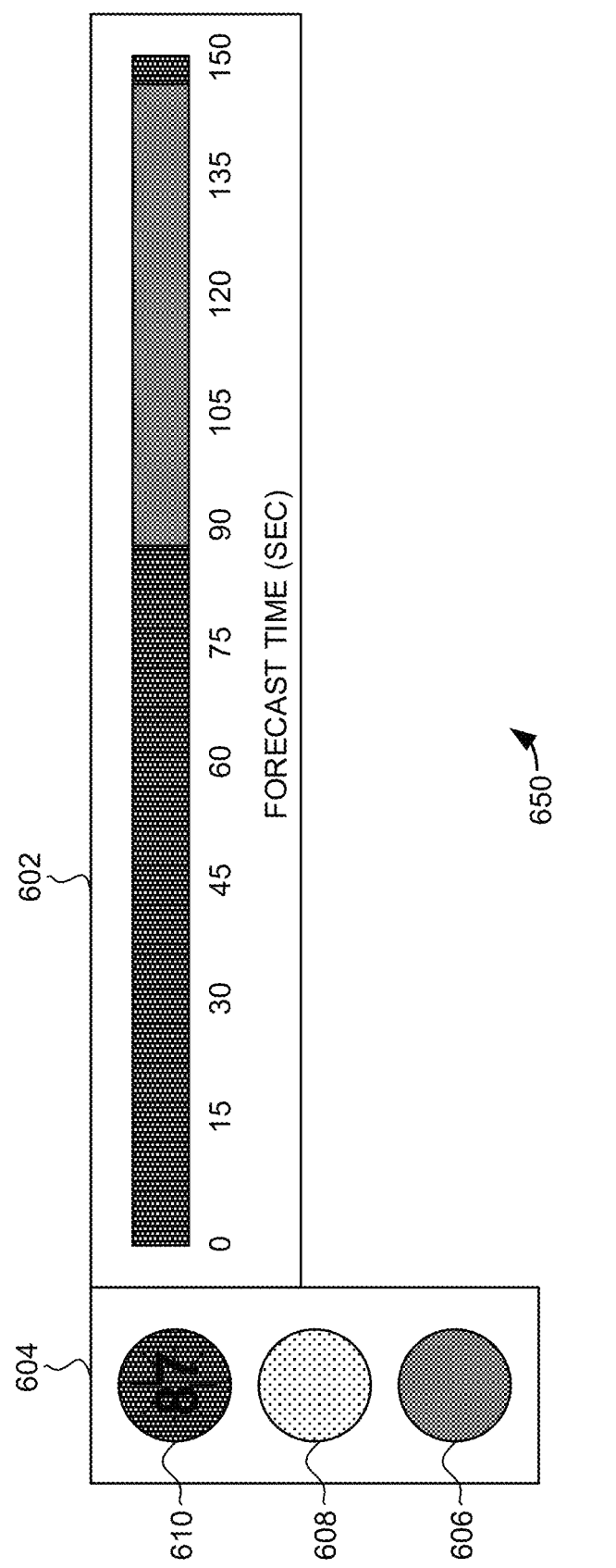
Figure 6E:
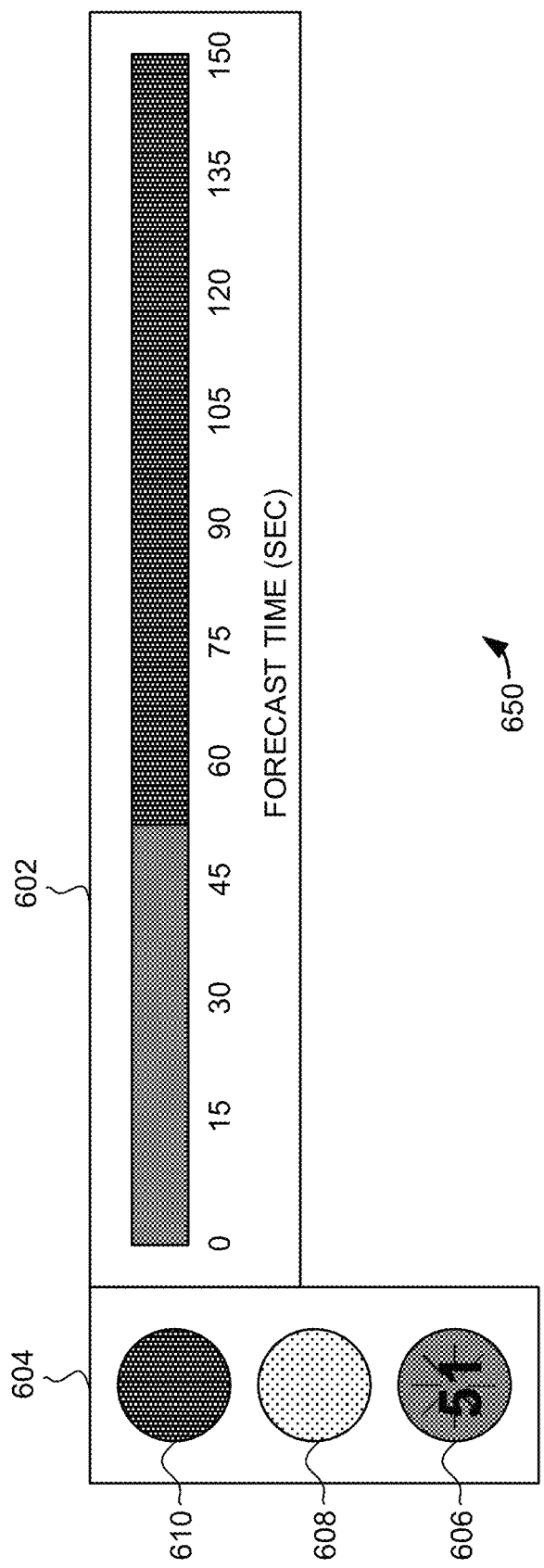
Figure 6F:
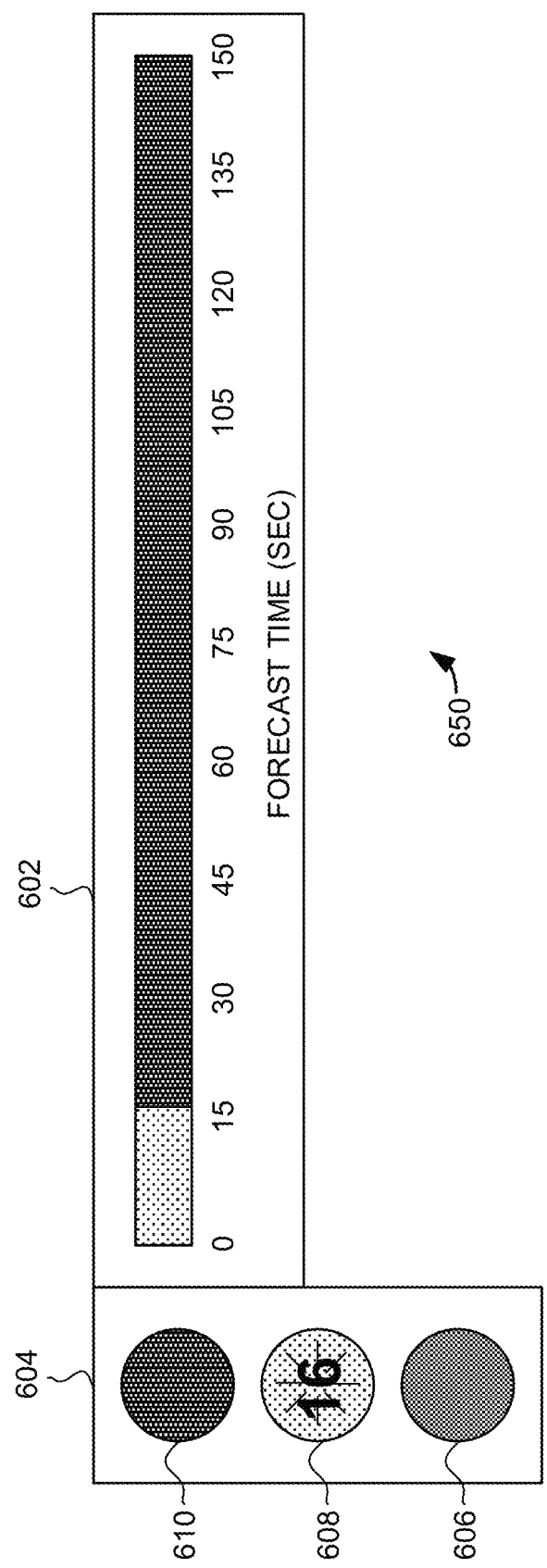

Turning now to FIGS. 6D-6F, schematic diagrams of another exemplary display screen window 650 are illustrated. As with the previous example, the display screen window 650 includes a stoplight representation 604 in addition to operational period indicators 602. However, in this embodiment countdown timers are added to the display screen window 650. These countdown timers indicate the remaining time in the current time period.

In the embodiment of FIGS. 6D-6F the countdown timers are added to the status indicators 606, 608, and 610 of the stoplight representation 604. Specifically, a countdown timer is added to the status indicator corresponding to the current operational status.

FIG. 6D shows a countdown timer in the status indicator 610. Again, the status indicator 610 is activated where at a current time period the ship motion forecasts are not under the at least one motion threshold for the time period exceeding the time threshold. The countdown timer in the status indicator 610 shows the remaining time of the current time period, in this example 87 seconds. Thus, 87 seconds is the time remaining before the next change in operational status. In this case, it is the time remaining before the next operational period starts where ship motion forecasts are next expected to meet operational requirements, that is to say the motions and/or wave height forecasts are all less than the set operational limits for a time period exceeding the time threshold.

Next, FIG. 6E shows a countdown timer in the status indicator 606. Again, the status indicator 606 is activated when the current time period is one where the ship motion forecasts are under the motion threshold for the time period exceeding the time threshold. The countdown timer in the status indicator 606 shows the remaining time of the current time period, in this example 51 seconds. Thus, there are predicted to be 51 seconds where ship motion forecasts are expected to be under all the set motion thresholds and certain ship operations can be performed and thus before the next change in operational status.

Next, FIG. 6F shows a countdown timer in the status indicator 608. Again, the status indicator 608 is activated when the current time period was initially above the time threshold but a currently remaining portion of the current time period is now below the time threshold. The countdown timer in the status indicator 608 shows the remaining time of the current time period, in this example 16 seconds. Thus, there are 16 seconds remaining where ship motion forecasts are expected to be under all set motion thresholds and certain ship operations can be performed.

Figure 6G:
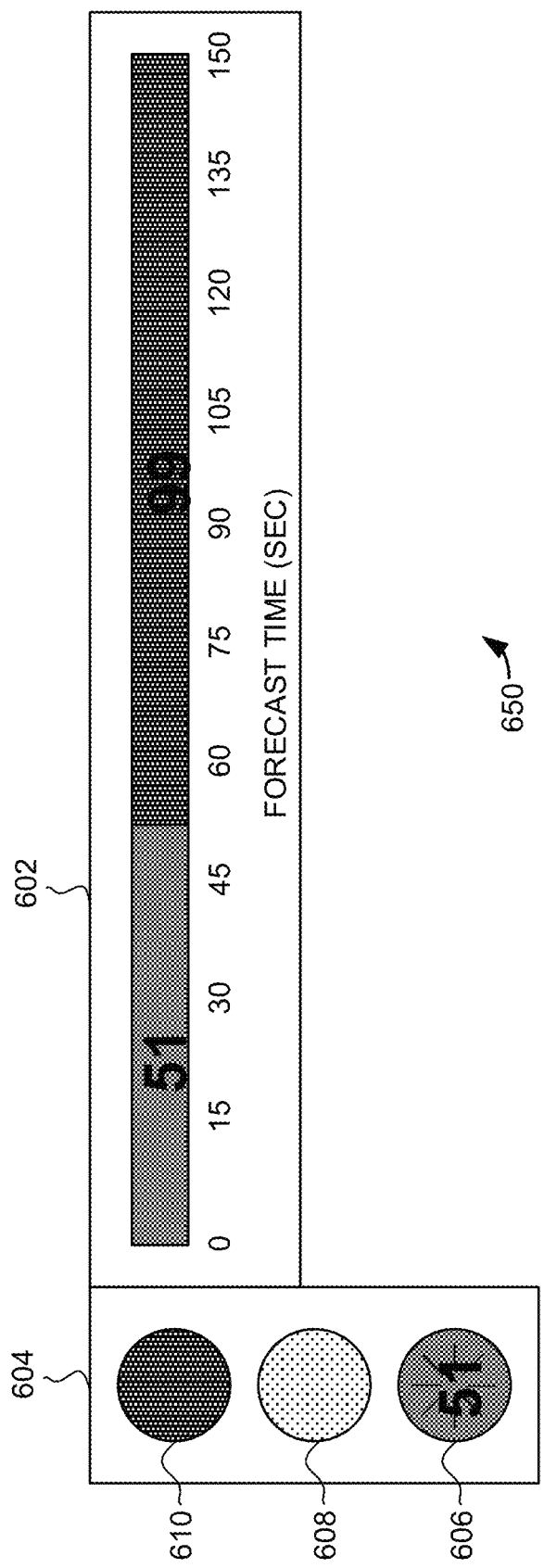

As was noted above, in the embodiment of FIGS. 6D-6F the countdown timers are added to the status indicators 606, 608, and 610 of the stoplight representation 604. However, this is just one example, and in other embodiments the countdown timers can be added to other locations on the display screen window 650. For example, the countdown timers could be added to the corresponding operational period indicators 602 themselves. An example of such an embodiment is shown in FIG. 6G.

In one embodiment the ship motion forecasting system can use multiple radars (e.g., multiples of radar 108) to generate the ship motion forecasts. Each of these multiple radars would include its own radar transceiver, and thus each of the multiple radars is able to independently transmit and receive radar signals. Each of the multiple radars can thus independently transmit radar signals that reflect off the water surface, are received, and are used to generate radar data. The radar data from the multiple radars can then combined and used to generate the ocean wave components by the ocean wave component generator. The generated ocean wave components are then used to generate the ship motion forecasts.

The use of multiple radars can improve the forecasting of wave and ship motion in a variety of ways. For example, the use of multiple radars can increase the accuracy the generated ocean wave components by inputting more observations of the ocean surface. The use of multiple radars also effectively increases the signal-to-noise ratio of the radar signals used to generate ocean wave components. Increased signal-to-noise ratio reduces the error in the wave computational process and yields more accurate wave field calculations and thus more accurate ship motion forecast. The use of multiple radars can also increase the scanned area of the water surface and can thus facilitate more comprehensive wave and corresponding ship motion forecasts. For example, in many applications a single radar could not be effectively positioned to provide a full 360 degree scan of the water surface around a ship. However, with multiple radars the different radars can be configured to operate in different regions or at different ranges in a way that together provides full or nearly full 360 degree view of the surrounding area and to the extent of maximum range.

In some embodiments, the radar data from multiple radars is combined by separately generating moment data from the radar data from each radar, filtering the generated moment data, and then combining the filtered moment data. This combined moment data can then be used to more accurately generate the ocean wave components. In yet other embodiments, the radar data from the multiple radars is combined by generating ocean wave components from radar data from each radar separately and then combining the ocean wave components.

The use of multiple radars in generating ship motion forecasts can be implemented in a variety of ways. For example, the multiple radars can be mounted together on one ship, or can be mounted across multiple ships. In one embodiment, a first radar is positioned to have a view of the body of water proximate the fore region of the ship, while the second radar is positioned on the ship to have a view of the body of water proximate an aft region of the ship. In such an embodiment, the first radar can position in the fore region of the ship, while the second radar is positioned in the aft region of the ship. In another embodiment, a first radar is positioned to have a view of the body of water proximate the starboard region of the ship, while the second radar is positioned on the ship to have a view of the body of water proximate the port region of the ship. In such an embodiment, the first radar can be positioned in a starboard region of the ship, while the second radar is positioned in a port region of the ship. Finally, it should be noted that none of these embodiments are limited to using only two radars. And thus three or more radars could also be implemented and used.

Figure 7:
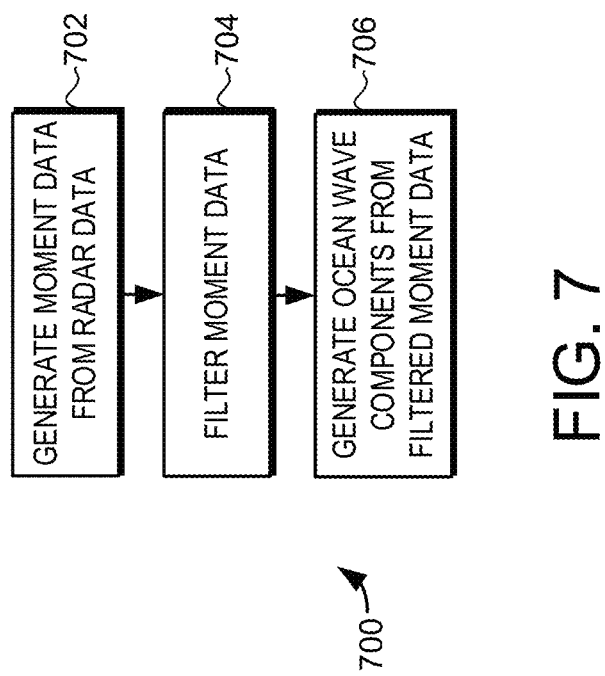
FIG. 7 is flow diagram of an exemplary ship motion forecasting method in accordance with various embodiments of the present invention.

As was described above, in some embodiments the ship motion forecasting systems and methods use radar data to determine ocean wave components, and from those ocean wave components determine future ship motion forecasts (See step 304 in method 300). A variety of different techniques can be used to generate such ocean wave components from the radar data. Turning now to FIG. 7, an exemplary method 700 of generating ocean wave components is illustrated. The method 700 is an example of the type of method that can be used to determine ocean wave components from radar data.

The first step 702 is to generate moment data from the radar data. In general, the moment data can include frequency and power information statistically derived from the radar data. For example, moment data can comprise the frequency-shift value (i.e. Doppler shift) of the radar signal which corresponds to the velocity of the ocean surface patch at a particular azimuth, range, and time. Moment data can also include the power return of the radar signal and the signal-to-noise ratio. In in a typical embodiment step 702 would be performed for each processing cycle. Thus, new moment data can be generated for each scan of each radar. Furthermore, this radar data includes both in-phase (I) and quadrature phase (Q) components which are used to calculate the moment data.

As was described above, the radar data can include radar data from one or more radars. In these embodiments first moment data can generated from the first radar data generated by the first radar, while second moment data is generated from the second radar data generated by the second radar. The first moment data can then represent a frequency shift of the first radar signals, while the second moment data can represent a frequency shift in the second radar signals.

As one example, a method of moments analysis can be performed on the radar data from these one or more radars to determine the frequency shift for the returned radar signals for each patch of the water surface. Additionally, the method of moments analysis can determine both signal variance and signal power return for each patch of the water surface. The frequency shift of the returned radar signals, sometimes referred to as a Doppler shift, results from the relative motion of the corresponding patch of water, and thus can be used to determine the wave velocity of the corresponding patch of water surface.

In one embodiment the methods of spectral moments analysis provide as a first moment a peak frequency shift, and as a second moment a distribution or variance of the frequency shift. From this, the methods of spectral moments analysis provides a distribution or spectrum of velocities for each patch of water. This distribution or spectrum of velocities can be characterized by its variance, and such a variance can be considered a measure of the signal to noise ratio of the distribution. For a more detailed example of such a spectral moments analysis see "Development of an Environmental and Ship Motion Forecasting System" by Benjamin S. H. Connell et al, Proceedings of the ASME 2015 34th International Conference on the Ocean, Offshore and Artic Engineering.

The next step 704 is to filter the moment data. In general, this filtering of the moment data is performed to identify and isolate the moment data that is likely relevant to making ship motion forecasts while removing other moment data. For example, the filtering can be performed on a sector-by-sector or patch-by-patch basis by identifying which sectors and/or patches of the water surface contain waves that are likely to significantly cause ship motion and isolating the moment data for those patches. By filtering the moment data to include only moment data that is relevant to ship motion forecasts the computational intensity of later steps in the process can be greatly reduced. Specifically, the number of ocean wave components that will be need to be generated from the moment data is significantly reduced by the filtering, and thus the process can be completed faster and with less computational resources.

In one embodiment, the step 704 keeps only the moment data from sectors and/or patches of water which have been identifies as containing wave features that are likely to impact the motion of the ship. This can be performed by identifying which sectors and/or patches contain wave-features that are moving at a speed and in a direction that will result in the waves hitting the ship, taking into account the location, speed and direction of the ship. To facilitate this information regarding the direction and speed of the ship can be provided by GPS and/or the ship navigation system.

Thus, in an embodiment with one or more radars, the filtering of first moment data can comprise filtering based at least in part on wave-feature speed and/or direction for each sector in a first plurality of sectors in the first portion of the body water to identify portions of the first plurality of sectors that contain waves relevant to forecasting ship motion. Likewise, the filtering of second moment data can comprise filtering based at least in part on wave-feature speed and/or direction for each sector in a second plurality of sectors in the second portion of the body water to identify portions of the second plurality of sectors that contain waves relevant to forecasting ship motion.

A relatively quick determination of the direction of waves in each patch can be determined by generating a two dimensional directional spectrum from the radar data without regard to wave phase or timing. This determination of the direction of waves and which waves will hit the ship can be made on azimuthal sector by sector basis, such that the moment data for sectors that contain waves moving in a direction that may impact the ship can be identified and kept, while the moment data for other sectors is filtered out. In making these determinations the waves in each of the various sectors can be assumed to closely follow linear wave theory where the speed of wave depends upon the wavelength or frequency of the wave.

As another example, the distance to waves in each patch can be quickly determined and patches that are too far or too close to impact ship motion in a selected time period can be excluded. In a typical embodiment these distances can be preconfigured based on typical wave speeds during set up of the wave forecasting system.

Furthermore, this filtering can be performed by identifying which patches contain waves having a period or frequency that is likely to induce significant motion in a degree of freedom of interest. In this case that would depend on the size and shape of the ship. For example, in system designed for a material transport ship the moment data for patches that contain waves having a period below 7 seconds and longer than 18 seconds may be filtered out as not likely to cause significant ship motion. Again, in a typical embodiment these periods of interest can be selected during set up of the wave forecasting system based on the parameters of the ship.

Thus, in an embodiment with one or more radars, the filtering of first moment data can comprise filtering based at least in part on wave period for each sector in a first plurality of sectors in the first portion of the body water to identify portions of the first plurality of sectors that contain waves relevant to forecasting ship motion. Likewise, the filtering of second moment data can comprise filtering based at least in part on wave period for each sector in a second plurality of sectors in the second portion of the body water to identify portions of the second plurality of sectors that contain waves relevant to forecasting ship motion.

Furthermore, this filtering can be configured to remove redundant radar data received from the one or more radars by filtering out overlapping data. Specifically, in this embodiment the filtered data from each of the one or more radars is limited to certain patches of the body water such that remaining data for each patch was received from only one radar. In this embodiment the filtered radar data that can be selected based on the relative positions of each radar, the power of the received radar signals from each radar, or noise in the radar data from each radar.

In other embodiments the moment data for patches with relatively high-energy waves are kept while moment data for low energy areas is filtered out.

In each of these examples the step 704 filters the moment data identify and isolate the moment data that is likely relevant to making ship motion forecasts. By filtering the moment data to include only moment data that is relevant to ship motion forecasts the computational intensity required for the next step can be greatly reduced.

The next step 706 is to generate ocean wave components from the filtered moment data. Again, these ocean wave components are discrete representations that describe a sensed wave, and in a typical embodiment new ocean wave components would be generated using the plurality of patches from several scans of the radar (tens of seconds), filtered by which patches contain information about wave-features that likely to impact future ship motions. When completely generated the collection of ocean wave components can define the portions of the water surface relevant to ship motion forecasting by wave frequency, direction of propagation, amplitude and phase. Furthermore, a linear superposition of these generated ocean wave components and their evolution in time can then be used to provide a deterministic forecast of the ocean surface elevation over a forecast interval.

A variety of techniques can be used to generate the ocean wave components. As a general example, a regression processes can be used to generate ocean wave components by iteratively selecting ocean wave components that loosely match the filtered moment data. Such a regression process can be considered to be an over-constrained least-squares fitting of the filtered moment data to the desired set of ocean wave components. This regression processes effectively facilitates the reconstruction of the relevant wave field from the filtered moment data, with that reconstruction taking the form of the generated ocean wave components. It should be noted again that the generated ocean wave components in this process are over-determined, and this allows the regression to overcome noise in the filtered moment data.

Generally the regression is configured to determine the number of ocean wave components necessary to define a stable solution for the portions of the water surface at interest. This number of ocean wave components can be predetermined and configured in the setup of the system.

As one example, in an implementation that utilizes on the order of ~100,000 pieces of moment data the system can be configured to generate ~1000 discrete ocean wave components.

With the ocean wave components generated they can be used to generate future ship motion forecasts. As described above with reference to step 306 of FIG. 3, in one embodiment the ocean wave components are provided as inputs to a lookup database, with the lookup database then providing the resulting forecasts of ship motions from pre-calculated values. Thus, the system can facilitate the real time determination of several minutes of ship motion forecasts for each radar scan and each cycle of wave component calculation.

As was described above, the ship motion forecasting systems and methods described herein can use multiple radars to generate the ship motion forecasts. These multiple radars each transmit radar signals that reflect off the water surface, are received, and used to generate radar data. To facilitate the use of multiple radars in a ship motion forecasting system the radars can be configured to scan different areas of the water surface. In some embodiments these different areas can be non-overlapping while in other embodiments the different areas are partially overlapping.

Figure 8A:
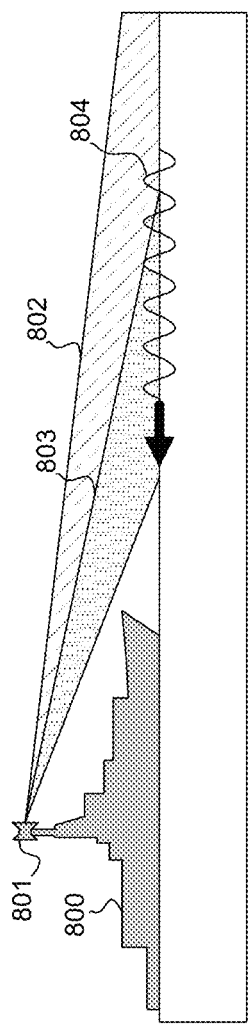
FIGS. 8A and 8B are schematic diagrams of an exemplary ship with a ship motion forecasting system in accordance with various embodiments of the present invention.
Figure 8B:
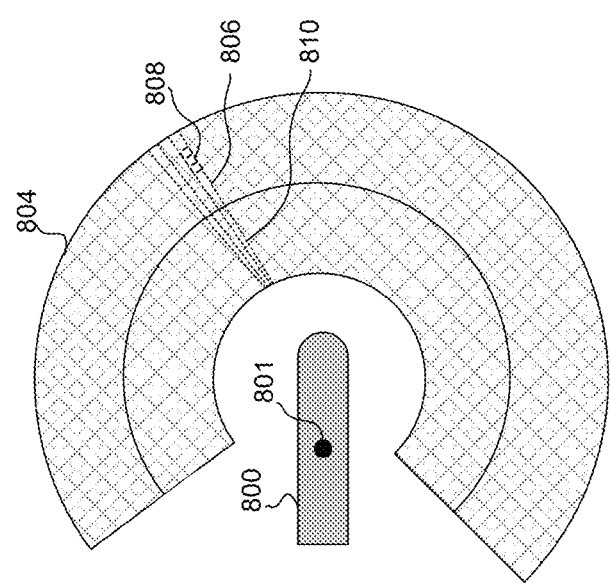

Turning now to FIG. 8A, a side view of an exemplary ship 800 with two radars 801 is illustrated, while FIG. 8B illustrates a top view. In this embodiment the antennas for the two radars 801 are mounted in the same general location on the ship 800, but they are configured to scan different areas of the water surface 804. Specifically, the first radar is configured to transmit radar signals 802 that reflect off the water surface 804 at areas relatively far from the ship 800. Such a configuration can be used to overcome minimum and maximum range limits for the radar. For example, the two radars 801 can provide full coverage for an implementation where a single radar cannot provide both scanning sufficiently near the ship (to detect close waves) and sufficient farm from the ship (to detect far waves).

Because the first radar performs a rotational scan these areas scanned by the first radar can be considered to comprise a first a plurality of azimuthal sectors 806. Likewise, the second radar is configured to transmit radar signals 803 that reflect off the water surface 804 at areas relatively close to the ship 800. Again, because the second radar performs a azimuthal scan these areas scanned by the second radar can be considered to comprise a second plurality of azimuthal sectors 810. The reflected radar signals 802 and 803 are received back at the ship 800 where they are used to determine a forecast of future ship motion. It should be noted that while the first plurality of azimuthal sectors 806 and the second plurality of azimuthal sectors 810 are not shown as overlapping, that in some embodiments the scan areas and resulting azimuthal sectors could partially overlap. Finally, it should be noted that FIGS. 8A and 8B are not drawn to scale, and that in a typical implementation areas of water surface 804 scanned by the radars 801 would be much larger relative to the ship of the ship 800.

Again, the radar signals 802 and 803 can be utilized and combined in multiple ways. In some embodiments, the radar data from radar signals 802 and 803 can be combined by generating moment data from the radar signals 802 and 803 separately, filtering the generated moment data, and then combining the filtered moment data to generate all of the ocean wave components. In yet other embodiments, the radar data from radar signals 802 and 803 can be combined by generating ocean wave components from radar signals separately and then combining the ocean wave components. For example, the radar signals 802 and 803 from non-overlapping angular regions can first be separately processed to generate ocean wave components for the non-overlapping angular regions, and then those ocean wave components can be combined.

Figure 9B:
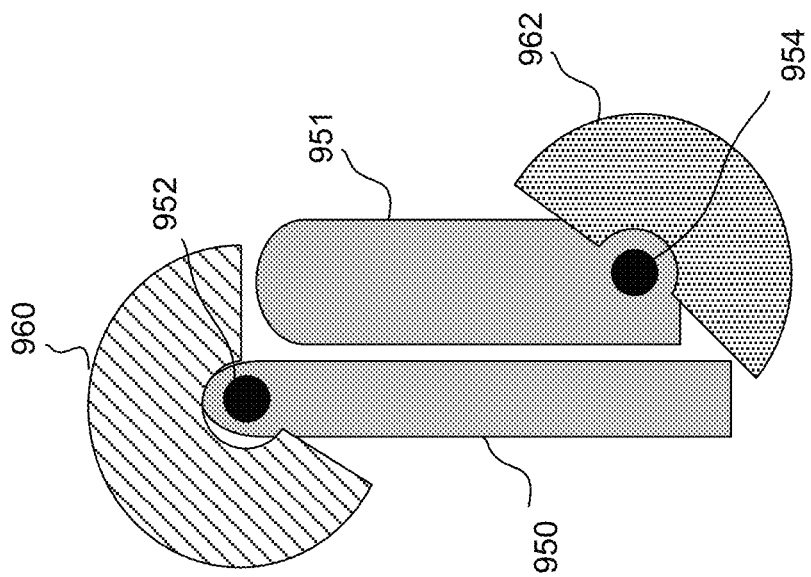
FIGS. 9A and 9B are schematic diagrams of an exemplary ships with a ship motion forecasting system in accordance with various embodiments of the present invention.
Figure 9A:
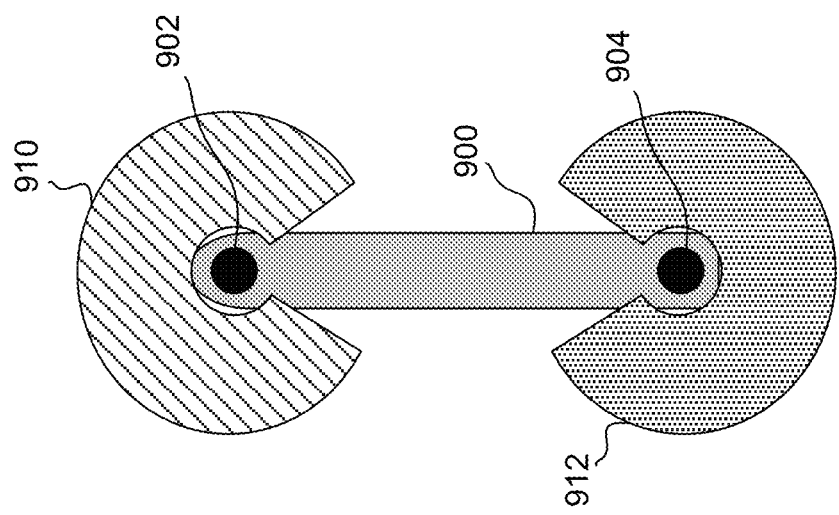

Again, this is just one example of how multiple radars can be configured and used for ship motion forecasting. Turning now to FIG. 9A, a top view of an exemplary ship 900 is illustrated. This ship includes a first radar 902 and a second radar 904 used for ship motion forecasting. At least the antenna for the first radar 902 is mounted in the fore area of the ship 900, while at least the antenna the second radar 904 is mounted in the aft area of the ship 900. The two radars 902 and 904 are configured to scan different areas of the water surface. Specifically, the first radar 902 is configured to transmit radar signals that reflect off the water surface in region 910, around the fore area of the ship 900. Thus, the first radar 902 has a view of the body of water proximate the fore region of the ship. The second radar 904 is configured to transmit radar signals that reflect off the water surface in region 912, around the aft area of the ship 900. Thus, the second radar 904 has a view of the body of water proximate the aft region of the ship. Again, these regions 910 and 912 can both be considered to comprise a plurality of azimuthal sectors defined by the scanning region of the corresponding radar. It should be noted that the regions 910 and 912 are not drawn to scale, and in a typical implementation the radars would be configured to scan a much larger area relative to the ship 900.

In this embodiment the two radars 902 and 904 can together provide a full-field (e.g., 360 degree) scan of the water surface around the ship 900. Furthermore, this 360 degree scan can be provided for ships were the structure and arrangement of the ship would block a full scan from a single radar. For example, where significant radar blocking structure (e.g., the main bridge) exists along the axis of the ship 900.

While FIG. 9A shows multiple radars 902 and 904 mounted together on a ship 900 this is again just one way to implement a ship motion forecasting system to use multiple radars. For example, in other embodiments the multiple radars can be spread across multiple different ships. Turning now to FIG. 9B, a top view of a first ship 950 and a second ship 951 is illustrated. The first ship 950 and the second ship 951 are illustrated as being mechanically coupled together, as could occur during a cargo transfer between the ships. Of course, this is just one example and the first ship 950 and the second ship 951 could instead be in different close proximity configurations.

The first ship 950 includes a first radar 952 and the second ship 951 includes a second radar 954. Specifically, at least the antenna for the first radar 952 is mounted on the first ship 950, while at least the antenna the second radar 954 is mounted on the second ship 951. The two radars 952 and 954 are again configured to scan different areas of the water surface. Specifically, in this configuration the first radar 952 is configured to transmit radar signals that reflect off the water surface in region 960, around the fore area of the ship 950 and ship 951. The second radar 954 is configured to transmit radar signals that reflect off the water surface in region 964, around the aft area of the ship 950 and ship 951. Again, these regions 960 and 962 can both be considered to comprise a plurality of azimuthal sectors defined by the scanning region of the corresponding radar. It again should be noted that the regions 960 and 962 are not drawn to scale, and in a typical implementation the radars would be configured to scan a much larger area relative to the ships 950 and 951.

It should be noted that in this embodiment a communication network between the radars 952 and 954 can be established and used to facilitate the collection of the radar data at a single ship motion forecasting system. For example, a wireless data network can be established between the two ships 950 and 951 and used to transfer the radar data from one ship to the other, where the ship motion forecasting of both ships can then be performed together on one unified system. It should also be noted that in some cases some processing of the radar data could be performed on one ship before the radar data is transferred to the other ship to reduce the data-rate of the communications network between the ships.

Again, the radar signals generated by two radars in FIGS. 9A and 9B can be utilized and combined in multiple ways. In some embodiments, the radar data from radar signals can be combined by generating moment data from the radar signals separately, filtering the generated moment data, and then combining the filtered moment data to generate all of the ocean wave components. In yet other embodiments, the radar data from the two radars can be combined by generating ocean wave components from radar signals separately and then combining the ocean wave components. For example, the radar signals from different radars scanning non-overlapping angular regions can first be separately processed to generate ocean wave components for the non-overlapping angular regions, and then those ocean wave components can be combined.

Figure 10:
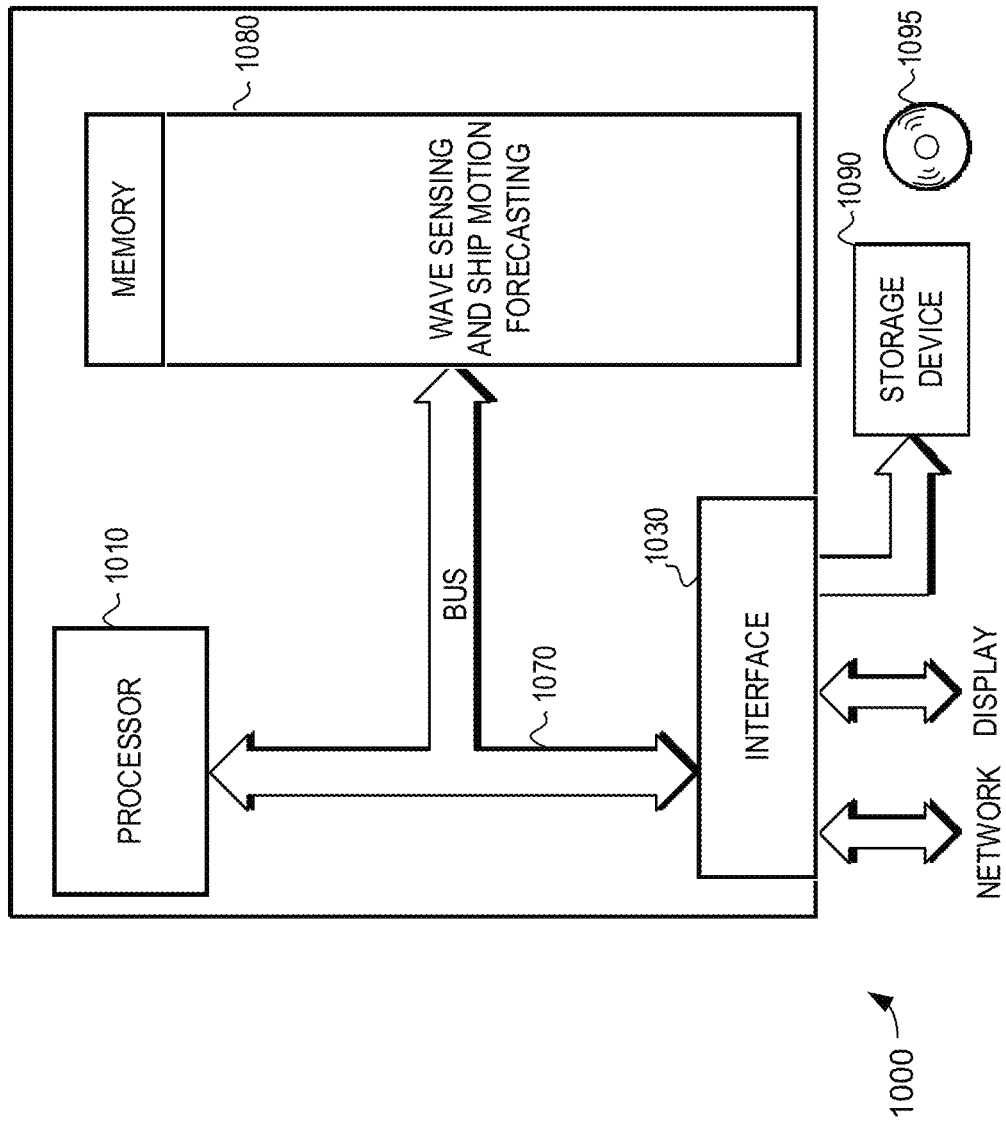
FIG. 10 is a schematic diagram of an exemplary processing system in accordance with various embodiments of the present invention.

Turning now to FIG. 10, an exemplary processing system 1000 is illustrated. Processing system 1000 illustrates the general features of a processing system that can be used to implement a ship motion forecasting system. Of course, these features are merely exemplary, and it should be understood that the invention can be implemented using different types of hardware that can include more or different features. It should be noted that the processing system 1000 can be implemented in many different environments, such as part of large networked computer system that spans multiple sites or as discrete individual computer system. For example, the processing system 1000 can implemented on a computer system aboard one or more ships for which ship motion forecasting is to be performed. The exemplary processing system 1000 includes a processor 1010, an interface 1030, a storage device 1090, a bus 1070 and a memory 1080. In accordance with the embodiments of the invention, the memory 1080 includes programs implementing the wave sensing and ship motion forecasting system. Thus, these programs can be implemented to perform the ship motion forecasting methods described above with reference to FIGS. 1-7B.

The processor 1010 performs the computation and control functions of the system 1000. The processor 1010 may comprise any type of processor, include single integrated circuits such as a microprocessor, or may comprise any suitable number of integrated circuit devices and/or circuit boards working in cooperation to accomplish the functions of a processing unit. In addition, processor 1010 may comprise multiple processors implemented on separate systems. For example, in the context of a multi-ship system (e.g., FIG. 7B) the processor 1010 could comprise one or more processors on a first ship and one or more processors on a second ship. In addition, the processor 1010 may be part of an overall larger computer system. During operation, the processor 1010 executes the programs contained within memory 1080 and as such, controls the general operation of the processing system 1000.

Memory 1080 can be any type of suitable memory. This would include the various types of dynamic random access memory (DRAM) such as SDRAM, the various types of static RAM (SRAM), and the various types of non-volatile memory (PROM, EPROM, and flash). It should be understood that memory 1080 may be a single type of memory component, or it may be composed of many different types of memory components. In addition, the memory 1080 and the processor 1010 may be distributed across several different physical devices that collectively comprise processing system 1000. For example, a portion of memory 1080 may reside on one computer system, and another portion may reside on a second computer system. For a specific example, in the context of a multi-ship system (e.g., FIG. 9B) the memory 1080 could comprise memory components on a first ship and memory components on a second ship.

The bus 1070 serves to transmit programs, data, status and other information or signals between the various components of processing system 1000. The bus 1070 can be any suitable physical or logical means of connecting computer systems and components. This includes, but is not limited to, direct hard-wired connections, fiber optics, infrared and wireless bus technologies. It should also be noted that aspects of the processing system 1000 could be implemented as a single system on a chip (SoC). In such a case the bus 1070 can comprise the internal bus of the SoC.

The interface 1030 allows communication to the processing system 1000, and can be implemented using any suitable method and apparatus. It can include a network interfaces to communicate to other systems such on board ship navigation and control systems and, terminal interfaces to communicate with technicians, and storage interfaces to connect to storage apparatuses such as storage device 1090. Storage device 1090 can be any suitable type of storage apparatus, including direct access storage devices such as hard disk drives, flash systems, solid-state drives and optical disk drives. As shown in FIG. 10, storage device 1090 can comprise a disc drive device that uses discs 1095 to store data.

It should be understood that while the present invention is described here in the context of a fully functioning computer system, those skilled in the art will recognize that the mechanisms of the present invention are capable of being distributed as a program product in a variety of forms, and that the embodiments described herein apply equally regardless of the particular type of recordable media used to carry out the distribution. Examples of recordable media include: magnetic disks, flash memory devices, hard drives, memory cards and optical disks (e.g., disc 1095).

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

The forgoing detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

What is claimed is:

1. A ship motion forecasting system, comprising:
at least one radar;
at least one display;
a processor;
a memory coupled to the processor; and
a ship motion forecasting program residing in the memory and being executed by the processor to:
  receive radar data from the at least one radar reflecting signals off a body of water;
  generate ocean wave components from the received radar data;
  generate ship motion forecasts from the generated ocean wave components; and
  generate on the at least one display a graphical indication of the ship motion forecasts over a future time period,
    where the graphical indication includes a first operational period indicator for ship motion forecasts under at least one motion threshold for a first future time period exceeding a time threshold, where the first operational period indicator extends along an axis to represent the first future time period for which ship motion forecasts are under the at least one motion threshold for the first future time period exceeding the time threshold,
    where the graphical indication includes a second operational period indicator for ship motion forecasts not under the at least one motion threshold for a second future time period exceeding the time threshold, where the second operational period indicator extends along an axis to represent the second future time period for which ship motion forecasts are not under the at least one motion threshold for the second time period exceeding the time threshold, and
    wherein the first operational period indicator is indicated in a first way and the second operational period indicator is indicated in a second way different from the first way.

2. The ship motion forecasting system of claim 1, wherein the ship motion forecasts includes ship motion forecasts for at least a first degree of freedom and a second degree of freedom.

3. The ship motion forecasting system of claim 1, wherein the ship motion forecasts includes ship motion forecasts for at least a first degree of freedom and a second degree of freedom, and wherein the at least one ship motion threshold includes at least a first ship motion threshold for the first degree of freedom and a second ship motion threshold for a second degree of freedom.

4. The ship motion forecasting system of claim 1, wherein the ship motion forecasts are generated from wave height forecasts, and wherein the first operational period indicator is generated additionally in response to the wave height forecasts being under a wave height threshold for the first future time period exceeding the time threshold.

5. The ship motion forecasting system of claim 1, wherein the at least one ship motion threshold and the time threshold are user configurable before and during operation.

6. The ship motion forecasting system of claim 1, wherein a confidence margin is added to each of the ship motion forecasts.

7. The ship motion forecasting system of claim 6, wherein the confidence margin is user configurable to provide a desired certainty level.

8. The ship motion forecasting system of claim 1, wherein the first way comprises a first color and wherein the second way comprises a second color different than the first color.

9. The ship forecasting system of claim 1, wherein the first way comprises a first intensity and wherein the second way comprises a second intensity different than the first intensity.

10. The ship motion forecasting system of claim 1, wherein the first operational period indicator comprises a first rectangular bar with one axis of the first rectangular bar corresponding to the first future time period, and wherein the second operational period indicator comprises a second rectangular bar with one axis of the second rectangular bar corresponding to the second future time period.

11. The ship motion forecasting system of claim 10, wherein the first way comprises coloring the rectangular bar in a first color and wherein the second way comprises coloring the rectangular bar in second color different than the first color.

12. The ship motion forecasting system of claim 1, wherein the graphical indication further comprises stoplight representation, where the stoplight representation is configured to indicate a current operational status.

13. The ship motion forecasting system of claim 1, wherein the graphical indication further comprises stoplight representation, where the stoplight representation is configured to indicate green where at a current time period the ship motion forecasts are under the at least one motion threshold for the first future time period exceeding the time threshold, and wherein the stoplight representation is configured to indicate red where at the current time period the ship motion forecasts are not under the motion threshold for the second future time period exceeding the time threshold.

14. The ship motion forecasting system of claim 13, where the stoplight representation is configured to indicate yellow where the current time period was initially above the time threshold but a currently remaining portion of the current time period is now below the time threshold.

15. The ship motion forecasting system of claim 1, wherein the graphical indication further comprises at least one countdown timer, the at least one countdown configured to indicate a time remaining in a current time period.

16. A ship motion forecasting system comprising:
  at least one radar;
  at least one display;
  a processor;
  a memory coupled to the processor; and
  a ship motion forecasting program residing in the memory and being executed by the processor to:
    receive radar data from the at least one radar reflecting signals off a body of water;
    generate ocean wave components from the received radar data;
    generate ship motion forecasts from the generated ocean wave components; and
    generate on the at least one display a graphical indication of the ship motion forecasts over a future time period,
      where the graphical indication includes a first operational period indicator for ship motion forecasts under at least one motion threshold for a first future time period exceeding a time threshold;
      where the graphical indication includes a second operational period indicator for ship motion forecasts not under the at least one motion threshold for a second future time period exceeding the time threshold;
      wherein the first operational period indicator is indicated as a first rectangular bar in a first color, where the first rectangular bar extends along an axis to represent a first future time period for which ship motion forecasts are under the at least one motion threshold for the first future time period exceeding the time threshold, and wherein the second operational period indicator is indicated as a second rectangular bar in a second color different from the first color, where the second rectangular bar extends along an axis to represent the second future time period for which ship motion forecasts are not under the at least one motion threshold for the second future time period exceeding the time threshold; and
      wherein the first operational period indicator and the second operational period indicator is updated with each cycle of generating the ship motion forecasts.

17. The ship motion forecasting system of claim 16, wherein the ship motion forecasts includes ship motion forecasts for at least a first degree of freedom and a second degree of freedom, and wherein the at least one ship motion threshold includes at least a first ship motion threshold for the first degree of freedom and a second ship motion threshold for a second degree of freedom.

18. The ship motion forecasting system of claim 16, wherein the graphical indication further comprises stoplight representation, where the stoplight representation is configured to be indicated as the first color where at a current time period the ship motion forecasts are under the at least one motion threshold for the first future time period exceeding the time threshold, and wherein the stoplight representation is configured to be indicated as the second color where at the current time period the ship motion forecasts are not under the motion threshold for the second future time period exceeding the time threshold.

19. A method of providing a forecast of future ship motion, comprising:
  receiving radar data from at least one radar reflecting signals off a body of water;
  generating ocean wave components from the received radar data;
  generating ship motion forecasts from the generated ocean wave components; and
  generating a graphical indication of the ship motion forecasts over a future time period for display to a user, where the graphical indication includes a first operational period indicator for ship motion forecasts under at least one motion threshold for a first future time period exceeding a time threshold, where the first operational period indicator extends along an axis to represent the first future time period for which ship motion forecasts are under the at least one motion threshold for the first future time period exceeding the time threshold, and where the graphical indication includes a second operational period indicator for ship motion forecasts not under the at least one motion threshold for a second future time period exceeding the time threshold, where the second operational period indicator extends along an axis to represent the second future time period for which ship motion forecasts are not under the at least one motion threshold for the second future time period exceeding the time threshold, and wherein the first operational period indicator is indicated in a first way and the second operational period indicator is indicated in a second way different from the first way.

20. The method of claim 19 wherein the ship motion forecasts includes ship motion forecasts for at least a first degree of freedom and a second degree of freedom, and wherein the at least one ship motion threshold includes at least a first ship motion threshold for the first degree of freedom and a second ship motion threshold for a second degree of freedom.

21. The method of claim 19 wherein the graphical indication further comprises stoplight representation, where the stoplight representation is configured to be indicated in the first way where at a current time period the ship motion forecasts are under the at least one motion threshold for the first future time period exceeding the time threshold, and wherein the stoplight representation is configured to be indicated in the second way where at the current time period the ship motion forecasts are not under the motion threshold for the second future time period exceeding the time threshold.

\* \* \* \* \*